United States Patent
Palumbo et al.

(10) Patent No.: US 6,181,418 B1
(45) Date of Patent: Jan. 30, 2001

(54) CONCENTRIC SPECTROMETER

(75) Inventors: Perry A. Palumbo, Gardiner; William L. Weber; Harold R. Van Aken, both of Wallkill, all of NY (US); Robert K. McMahan, Mebane, NC (US)

(73) Assignee: Gretag Macbeth LLC, New Windsor, NY (US)

( * ) Notice: Under 35 U.S.C. 154(b), the term of this patent shall be extended for 0 days.

(21) Appl. No.: 09/041,233

(22) Filed: Mar. 12, 1998

(51) Int. Cl.[7] ........................................................ G01J 3/18
(52) U.S. Cl. ............................................ 356/328; 356/305
(58) Field of Search .................................. 356/307, 305, 356/326, 328

(56) References Cited

U.S. PATENT DOCUMENTS

| | | |
|---|---|---|
| 3,185,021 | 5/1965 | Thompson . |
| 3,554,649 | 1/1971 | Ridgway . |
| 3,922,089 | 11/1975 | Danielson et al. . |
| 4,012,147 | 3/1977 | Walrafen . |
| 4,462,687 | 7/1984 | Krause ................................. 356/326 |
| 4,526,470 | 7/1985 | Kaye ................................... 356/319 |
| 4,546,256 | 10/1985 | Denisou et al. ..................... 356/324 |
| 4,568,187 | 2/1986 | Kita et al. ............................ 356/328 |
| 4,729,658 | 3/1988 | Poultney ............................. 356/328 |
| 4,743,112 | 5/1988 | Burke .................................. 356/326 |
| 4,850,706 | * 7/1989 | Mikes ................................. 356/328 |
| 4,895,445 | 1/1990 | Granger .............................. 356/328 |
| 4,984,888 | 1/1991 | Tobias ................................. 356/328 |
| 4,995,721 | 2/1991 | Krupa et al. ........................ 356/305 |
| 4,997,281 | 3/1991 | Stark ................................... 356/328 |
| 5,042,893 | 8/1991 | Ona . |
| 5,066,127 | 11/1991 | Schwenker ......................... 356/328 |
| 5,087,123 | * 2/1992 | Gerlacher et al. ................... 356/307 |
| 5,088,823 | 2/1992 | Smith et al. ........................ 356/328 |
| 5,139,335 | 8/1992 | Lundeen et al. .................... 356/328 |
| 5,479,258 | 12/1995 | Hinnrichs et al. .................. 356/326 |
| 5,488,474 | 1/1996 | Fateley et al. ...................... 356/326 |

OTHER PUBLICATIONS

Dyson, J., "Unit Magnification Optical System without Seidel Aberrations", Journal of the Optical Society of America, vol. 49, No. 7, Jul. 1959.

Offner, A., "New Concepts in Projection Mask Aligners," Optical Engineering, vol. 14, No. 2, Mar.–Apr. 1975.

Mertz, L., "Concentric spectrographs," Applied Optics, vol. 16, No. 12, Dec. 1977.

Kingslake, R., "Lens Design Fundamentals," Academic Press, 1978.

* cited by examiner

Primary Examiner—F. L. Evans
(74) Attorney, Agent, or Firm—Morgan & Finnegan, L.L.P.

(57) ABSTRACT

A concentric spectrometer which reduces stray light and re-entrant spectra within the spectrometer. The spectrometer includes a non-direct optical path between the entrance slit assembly and exit aperture. Dyson and Offner concentric optical configurations are used to eliminate third-order aberrations The concentric optical system includes a light trap which mitigates or eliminate stray light due to reflection of light incident on the exit aperture region but which does not impinge on the active area of a detector optically coupled to the exit aperture. A two-dimensional area array detector concurrently senses a spectral signal corresponding to an input optical radiation signal and a signal corresponding to zero-input radiation, and the spectral signal is corrected according to the zero-input radiation signal.

68 Claims, 11 Drawing Sheets

CONCENTRIC SPECTROMETER

TECHNICAL FIELD

The present invention relates generally to optical spectrometers or spectrophotometers and, more particularly, to a concentric spectrometer.

BACKGROUND OF THE INVENTION

A spectrometer is a device which receives a light signal as an input and produces as an output a light signal which is spread out, or dispersed, in space according the different wavelength components, or colors, of the input light signal. A detector attached to the spectrometer can analyze the output signal, called the spectrum, in order to quantify the amount of each wavelength component present in the input signal.

Spectrometers are used in myriad scientific and industrial applications. For example, they are used for the precise determination of color; such an application known as colorimetry. There are many commercial applications in which the precise knowledge of the color content of a sample material is vital to the successful outcome of a project. For example, in the automotive industry, exact color matching is essential when a portion of a vehicle is being painted so that the repainted portion matches the original color of the rest of the vehicle; the ability to repaint only the repaired portion of the vehicle rather than repainting the entire vehicle leads to considerable savings of money, materials, and time. Another example is in the aerospace industry; if an engineering determination is made for an optimum color scheme for an aircraft which minimizes its ability to be detected by the enemy, it is vital that the exact color specified can be provided by the paint supplier. These are only two of many possible examples of the importance of proper color matching in industrial applications.

Regardless of their specific application, it is important for spectrometers to be capable of preventing noise from interfering with the desired sample measurement. Two noise sources which represent a significant problem in state-of-the-art spectrometers are stray light and re-entrant spectra: stray light refers to any light arriving at the spectrometer output which results from anything other than the spectral dispersion of the input signal; re-entrant spectra refers to spectra resulting from multiple reflections off of the grating between the detector and entrance slit, thus giving rise to unwanted secondary spectra. It is appreciated that stray light and re-entrant spectra represent obstacles to achieving an improved signal-to-noise ratio, thus limiting measurement accuracy or sensitivity, dynamic range, and/or acquisition speed, while also generally requiring that applications using any excitation optical signal (e.g., colorimetry) must generally operate at higher power for a given acquisition or sampling time.

There is a need, therefore, for further improvements in spectrometers, and particularly, for a spectrometer which eliminates or substantially reduces noise, such as stray light and re-entrant spectra, in order to provide an improved signal-to-noise ratio.

SUMMARY OF THE INVENTION

The present invention overcomes the above, and other, limitations of prior and background art spectrometers by providing a concentric spectrometer having reduced stray light and re-entrant spectra within the spectrometer. In accordance with an aspect of the present invention, a spectrometer includes an entrance aperture through which an optical radiation signal is received, an exit aperture, an optical system, and a detector. The optical system includes a diffraction element, and directs the optical radiation signal along a non-direct optical path from the entrance aperture to the exit aperture via the diffraction element which spatially disperses the optical radiation signal according to wavelength. The detector is optically coupled to the exit aperture and detects at least a portion of the optical radiation signal directed by the optical system to the exit aperture. The optical radiation signal preferably includes a plurality of input optical radiation signals each guided into the entrance aperture by a respective optical fiber, with the optical fibers linearly oriented and spaced such that regions of zero input radiation are provided between the optical fiber cores.

The non-direct optical path is such that any diffracted radiation derived from energy dispersion by the diffraction element of the optical radiation incident thereon as it is directed by the optical system from the entrance aperture along the non-direct optical path cannot impinge on the entrance aperture. In accordance with an aspect of the present invention, the optical system is monocentric and is symmetric about an optical axis, the diffraction element spatially disperses the radiation according to wavelength along a dispersion direction, and the entrance aperture and exit aperture are separated from and located on opposite sides of a plane which contains the optical axis and is parallel to the dispersion direction, thereby providing the non-direct optical path between the entrance and exit apertures. The optical system may be implemented with a Dyson-type optical configuration, having a spherical plano-convex lens and a spherical concave diffraction grating which have a common center of curvature and optical axis. Alternatively, the optical system may be implemented with an Offner-type optical configuration, having a concave mirror and a convex diffraction grating which also have a common center of curvature and optical axis.

In accordance with another aspect of the present invention, the spectrometer includes a light trap structure which mitigates or eliminate stray light due to reflection of light incident on the exit aperture region but which does not impinge on the active area of the detector. In the Dyson-type optical configuration, the spherical plano-convex lens may incorporate the light trap structure, and preferably includes a combination of beveling, light absorbing media, and diffuse (e.g., substantially non-specular) reflecting characteristics.

In accordance with yet another aspect of the present invention, the detector is implemented as a two-dimensional area array detector which concurrently detects spectral signals corresponding to a plurality of input optical radiation signals input to the entrance slit. Additionally, the two-dimensional area array detector may be used to detect the spectral signal corresponding to at least one optical radiation signal input at the entrance slit and a signal corresponding to a region of zero input radiation at the entrance slit. The detected signal corresponding to the zero-input radiation region may be used to correct the detected input optical radiation signal(s) for stray light effects.

BRIEF DESCRIPTION OF THE DRAWINGS

Additional aspects, features, and advantages of the invention will be understood and will become more readily apparent when the invention is considered in the light of the following description made in conjunction with the accompanying drawings, wherein.

DETAILED DESCRIPTION OF THE PREFERRED EMBODIMENT

Figure 1A:
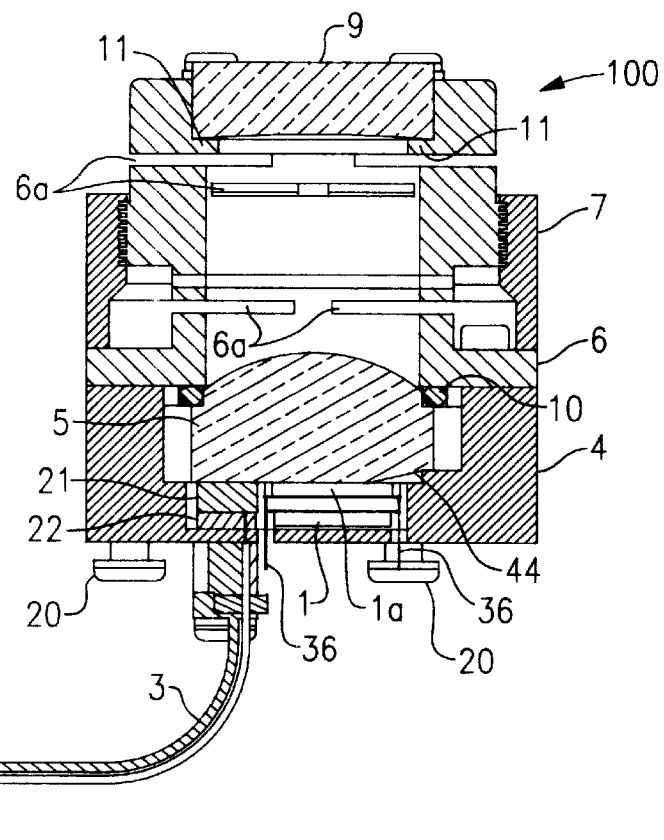
FIG. 1A is a schematic cross-sectional view in a plane parallel to the dispersion-axis and perpendicular to the cross-dispersion axis of a concentric spectrometer according to an embodiment of the present invention using a Dyson-type optical configuration.
Figure 1B:
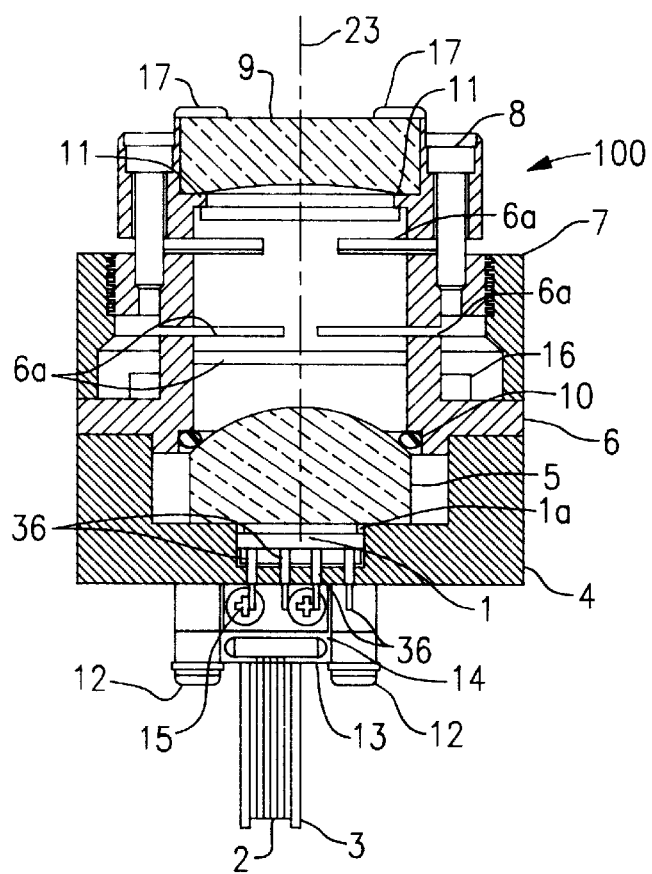
FIG. 1B, is a schematic cross-sectional view in a plane perpendicular to the dispersion direction axis and parallel to the cross-dispersion direction axis of the concentric spectrometer of FIG. 1A.
Figure 1C:
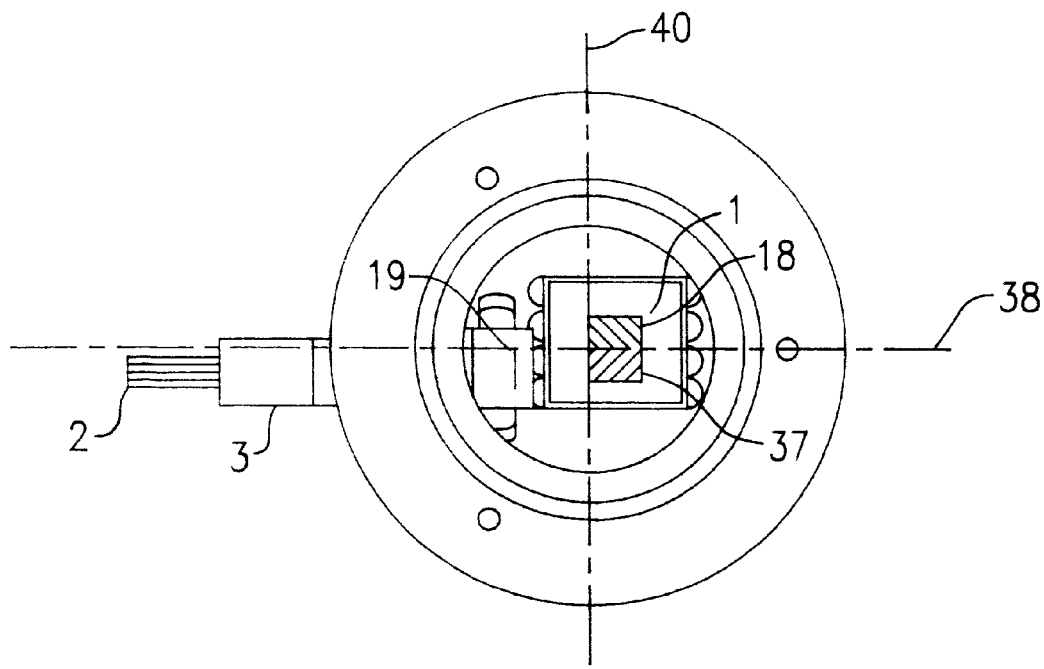
FIG. 1C shows a schematic cross-sectional view in the image plane of a concentric spectrometer of FIG. 1A.
Figure 1D:
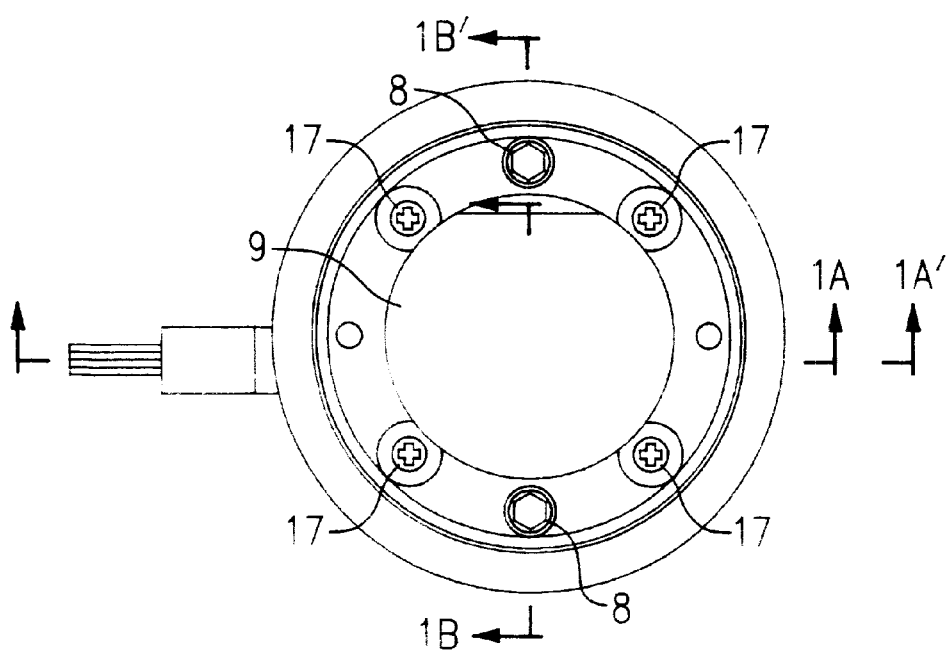
FIG. 1D shows a schematic plan view of the concentric spectrometer of FIG. 1A.

Referring to FIGS. 1A–1D there is shown a concentric spectrometer 100 according to an embodiment of the present invention using a Dyson optical configuration: FIG. 1A is a schematic cross-sectional view in a plane parallel to a dispersion direction axis, 38 and perpendicular to a cross-dispersion direction axis 40; FIG. 1B is a schematic cross-sectional view in a plane perpendicular to dispersion direction axis 38 and parallel to cross-dispersion direction axis 40; FIG. 1C shows a schematic cross-sectional view in image plane 24 (i.e., a plane coplanar with the focal plane where the image is formed by the optical system); and FIG. 1D shows a schematic plan view of the spectrometer.

More specifically, shown in FIGS. 1A–1D are area array detector 1 which includes detector element 37 having detector active area 18, detector window 1a of detector 1, optical fibers 2, fiber mount 3, main mount 4, field lens 5, flexure mount 6 containing flexure slots 6a, focus ring 7, tilt adjustment screw 8, concave diffraction grating 9, O-ring 10, optical stop 11, fiber mount retaining screw 12, fiber compliance mount 13, fiber retaining plate 14, fiber plate retaining screw 15, flexure mount retaining screw 16, grating retaining screw 17, entrance slit 19, spectrometer mounting screw 20, filter/slit substrate 21, fiber alignment aperture 22, and array detector electrical leads 36. Also shown as references for clarity of exposition of the optical system, are optical axis 23, image plane 24, dispersion direction axis 38, and cross-dispersion direction axis 40. As will be more fully understood hereinbelow, optical axis 23 extends radially through concentric concave diffraction grating 9 and field lens 5 from their common center of curvature. Dispersion direction axis 38, cross-dispersion direction axis 40, and optical axis 23 intersect and are mutually orthogonal. Image plane 24 is coplanar with the plane defined by dispersion to direction axis 38 and cross-dispersion axis 40, and represents the focal plane of the optical system. It is noted that, for clarity of exposition of detector 1, it is depicted in side view (i.e., not cross section) in the otherwise cross-sectional views of spectrometer 100 shown in FIG. 1A and FIG. 1B.

Main mount 4 supports fiber mount 3 containing optical fibers 2. Fiber mount 3 is held to main mount 4 by fiber mount retaining screws 12. Optical fibers 2 are mounted through fiber compliance mount 13, and are held to fiber mount 3 by fiber retaining plate 14 and fiber plate retaining screws 15. Area array detector 1 is attached via its detector window 1a to field lens 5. Field lens 5 is held by main mount 4, flexure mount 6, flexure mount retaining screws 16, and O-ring 10. Focus ring 7 and tilt adjustment screws 8 in combination with flexure slots 6a provide for positional adjustment (i.e., for focus and tilt) of concave diffraction grating 9 which is held by grating retaining screws 17. Optical stop 11 provides a means to set the f/# of the spectrometer (and also serves to retain diffraction grating 9, preventing it from slipping into the optical cavity), which permits using only the clear aperture of the grating, thereby reducing stringent requirements for the grating to be free of defects to the edge, thus reducing the cost of the grating. Spectrometer mounting screws 20 (e.g., for mounting the spectrometer to a printed circuit board) are visible on the fiber-coupling end of the spectrometer. Optical filter 21 with entrance slit 19 formed thereon by deposition of one or more metal and/or metal oxide films (e.g., nickel, nickel-oxide, chromium, chromium-oxide, aluminum, gold, silver, etc.) on filter 21 is centered within alignment aperture 22. By way of example, a black-through-base chromium oxide layer is electro-deposited on filter 21 and coated with an electro-deposited reflective chromium layer; thus, a non-reflective surface is presented to the spectrometer interior such that any reflections from the surface of the detector that are re-imaged near entrance slit 19 are attenuated, further reducing the reflected stray light within the spectrometer in addition to the stray light reduction techniques and methods described hereinbelow.

Figure 2A:
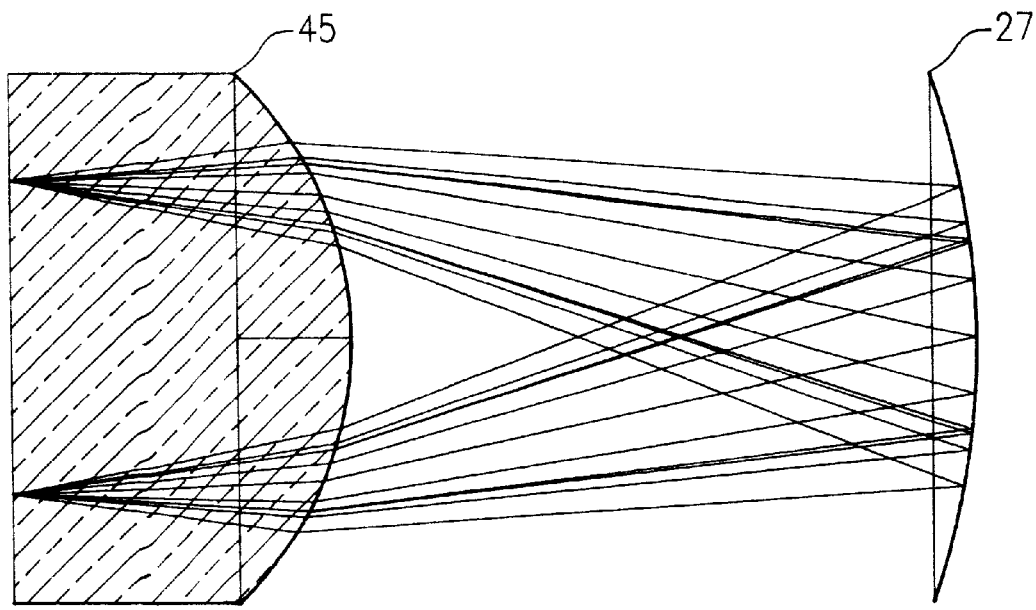
FIG. 2A is a schematic of the prior art Dyson optical configuration.
Figure 2B:
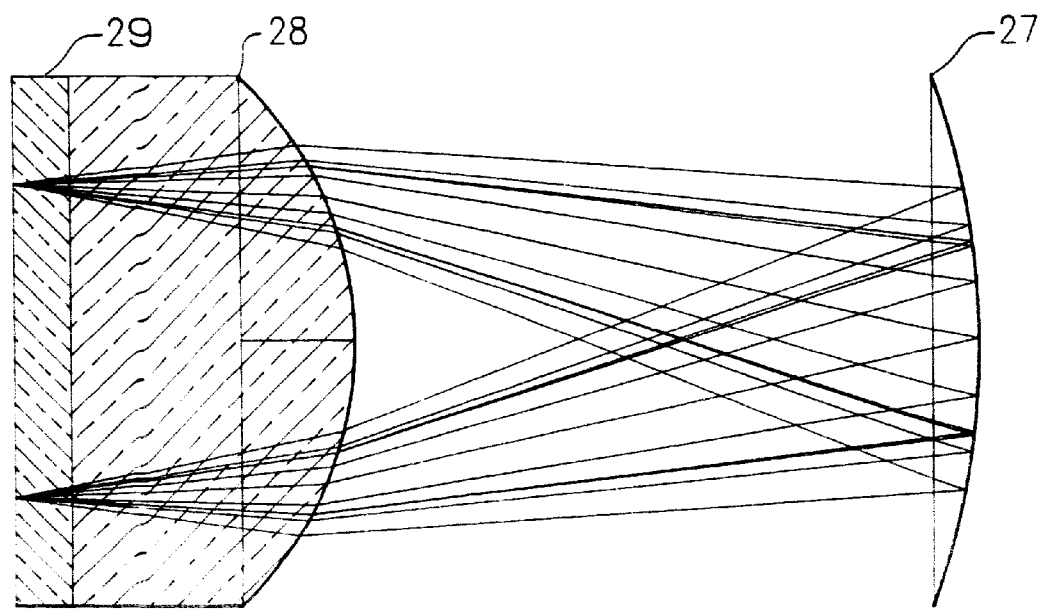
FIG. 2B illustrates a Dyson optical configuration modified to form a doublet, in accordance with an embodiment of the present invention.

In FIGS. 1A–1D, field lens 5 and concave diffraction grating 9 are arranged in a self-corrected unit magnification concentric form as described for a plano-convex field lens and a concave mirror by J. Dyson in "Unit Magnification Optical System Without Seidel Aberrations," Journal of the Optical Society of America, Vol. 49, page 713, 1959, which is incorporated by reference herein, and as described specifically for a spectrometer by L. Mertz, in "Concentric Spectrographs," Applied Optics, Vol. 16, page 3122, 1977, which is also herein incorporated by reference. In a concentric optical system, the optical elements are arranged such that their centers of curvature are coincident. FIG. 2A is a schematic of the Dyson optical configuration, including a plano-convex field lens 45 and concave mirror 27 (instead of a concave diffraction grating). This configuration eliminates third-order aberrations which would degrade the performance of the spectrometer. FIG. 2B illustrates the addition of optical filter 29 to plano-convex field lens 45 of the Dyson optical configuration of FIG. 2A to form doublet 28 which does not degrade the image quality provided by the Dyson optical configuration.

Figure 3A:
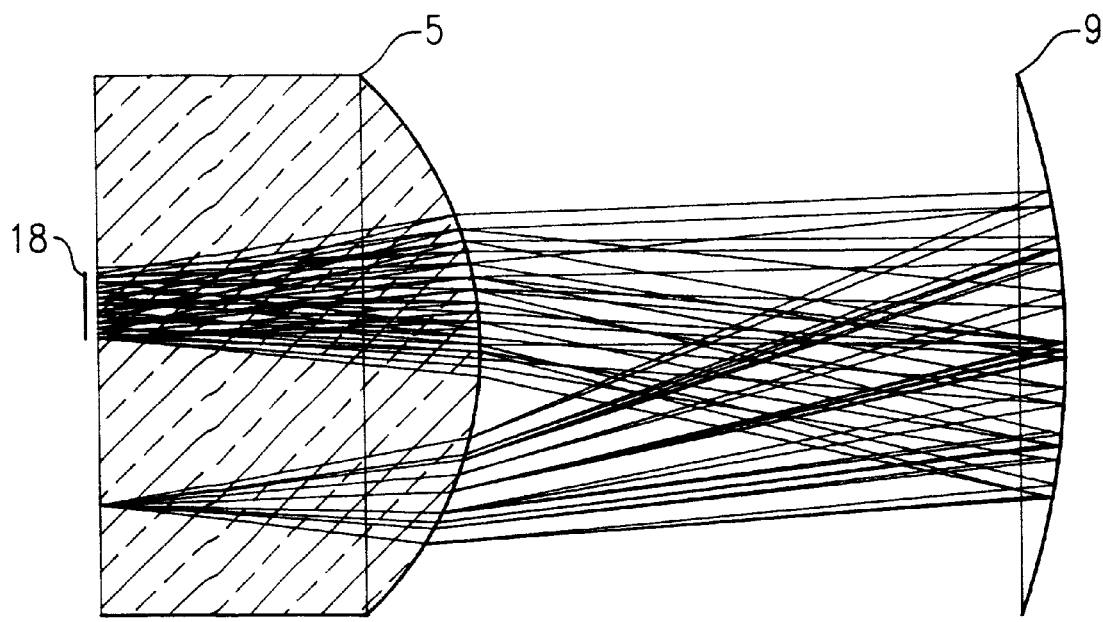
FIG. 3A is a schematic of the prior art Mertz concentric spectrometer optical configuration, which may be implemented in accordance with an embodiment of the present invention.

FIG. 3A is a side view showing an optical configuration in the dispersion direction and optical axis dimensions for a concentric spectrograph as disclosed by Mertz, supra, which may be implemented as the optical system in accordance with an embodiment of the present invention, such as that shown in FIGS. 1A–1D. In FIG. 3A, concave diffraction grating 9 having equally spaced parallel grooves (not shown) perpendicular to dispersion direction axis 38 (and parallel to cross-dispersion direction axis 40) is substituted to) for the concave mirror shown in the Dyson reference represented in FIG. 2; field lens 5 is a spherical plano-convex lens. As represented by the ray traces, the object and image planes are coplanar with the planar surface of plano-convex field lens 5. The optical arrangement of FIG. 3A forms an embodiment of a concentric spectrometer, also referred to herein as a Dyson-type spectrometer, or Mertz spectrometer. The refractive index and dispersion of the field lens 5 material are preferably selected to minimize the error in the linearity of the dispersion as a function of wavelength. Dispersion as a function of wavelength is usually specified in optical glass catalogs, such as those available from Schott Glass Technologies located in Duryea, Pa. In a present embodiment, BK7 glass is used.

It is known that monocentric spectrometers, like Dyson optical arrangements (e.g., FIG. 2A), provide large image fields free of third-order (Seidel) aberrations at high numerical aperture. Some advantages of a concentric spectrometer set forth by Mertz, supra, include: sharp imagery of the dispersion spectra, thereby reducing error in color determination; high numerical aperture, which relates to the light-gathering capability of the system; stigmatic field, i.e., equal magnification along x and y axes; flat field, i.e., the infocus points at the exit aperture of the system lie in a flat plane as opposed to lying on a curve; wide unvignetted, i.e., unobstructed field, permitting long slits; linear dispersion as a function of wavelength, i.e., the dispersed wavelengths are equally spaced; readily accessible field located at the exterior of the spectrometer; nonanamorphic field, i.e., equal magnification along and across the dispersion axes; telecentricity, i.e., the pupil is situated at infinity, therefore focusing errors introduce neither change in dispersion nor asymmetric imaging; no central obscuration of the pupil; and no aspherical optical surfaces, which are difficult and costly to manufacture.

As will be more fully understood hereinbelow, in accordance with an embodiment of the present invention, a concentric spectrometer is also advantageously implemented in a manner which provides a non-direct optical path between the entrance aperture (e.g., entrance slit 19) and exit aperture (e.g., region of planar surface of field lens 5 onto which dispersed energy impinges, the dispersed energy corresponding to an optical radiation signal input at the entrance aperture and which traverses the non-direct optical path) such that the dispersed energy (i.e., diffracted optical radiation, including all non-zero orders of diffraction) resulting directly from incidence onto the energy dispersive element (e.g., diffraction grating 9) of the optical radiation signal input at the entrance aperture and guided by the spectrometer optical configuration to the energy dispersive element cannot directly impinge onto the entrance aperture, thus essentially eliminating a source of multiple or re-entrant spectra.

Figure 4A:
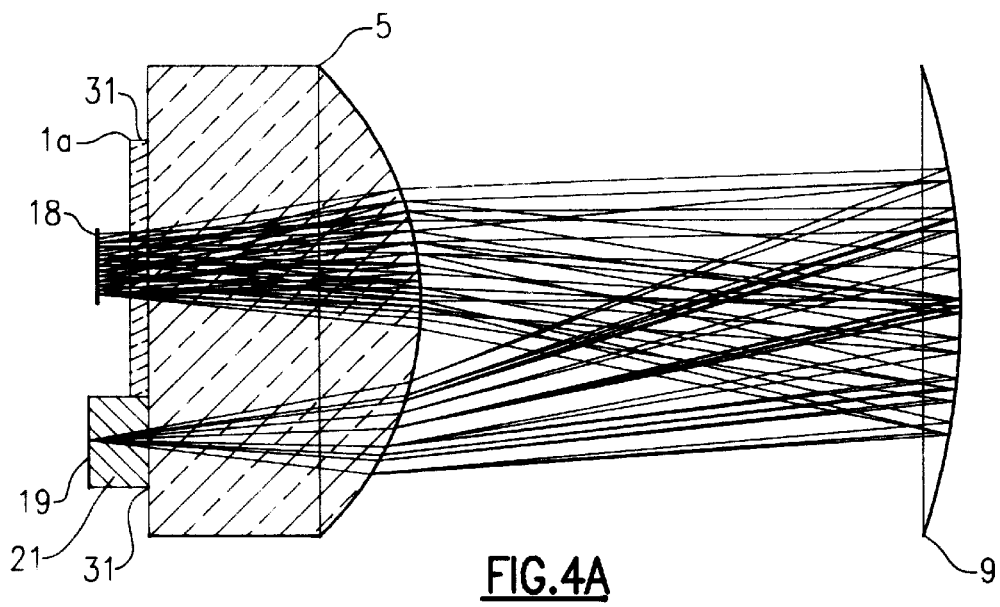
FIG. 4A is a schematic side view showing the dispersion direction and optical axis dimensions of an optical configuration according to an embodiment of the present invention.
Figure 4B:
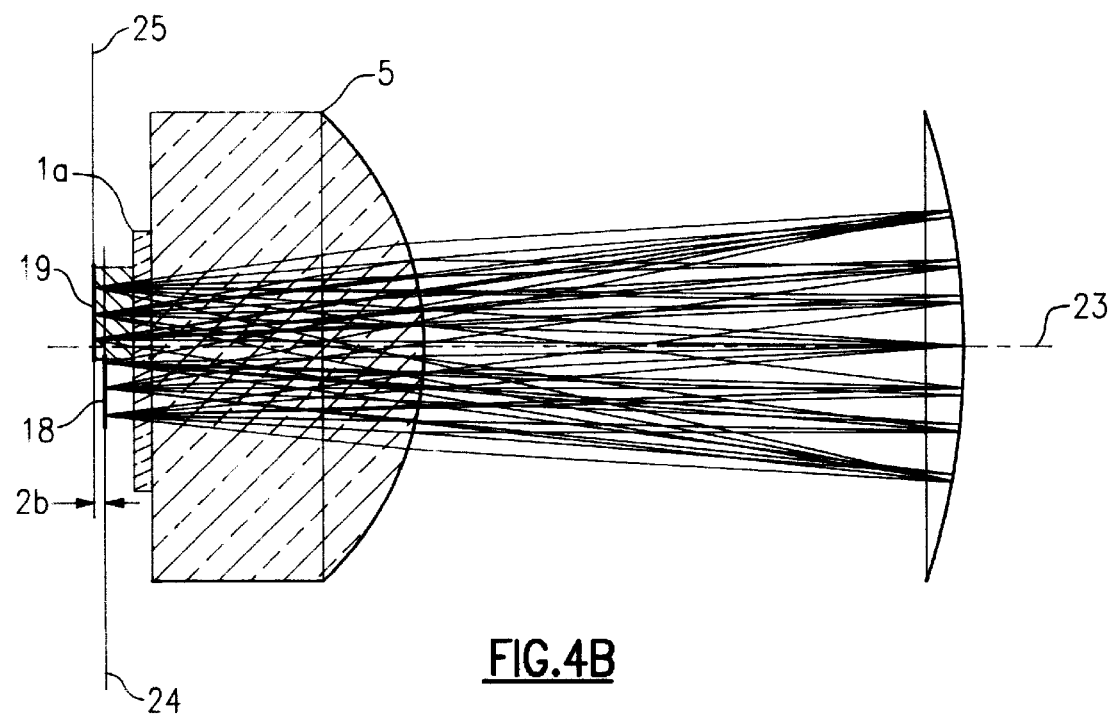
FIG. 4B is a schematic side view showing the cross-dispersion direction and optical axis direction dimension of the optical configuration shown in FIG. 4A.

FIGS. 4A and 4B show, in more detail, an optical configuration according to an embodiment of the present invention which may be implemented in accordance with the embodiment shown in FIGS. 1A–1D, More specifically, FIG. 4A is a side view showing the dispersion direction and optical axis dimensions, whereas FIG. 4B is a side view showing the cross-dispersion direction and optical axis direction dimensions. Referring to FIGS. 1A–1D and to FIGS. 4A and 4B, entrance slit 19 and detector active area 18 are shown displaced (by a separation distance 26) in parallel planes. The plane containing entrance slit 19 is normal to optical axis 23 and effectively contains the center of curvature for field lens 5, and is hereinafter referred to as object plane 25. The plane containing the image of entrance slit 19 and the imaged diffracted orders which fall incident on the detector 1 will hereinafter be referred to as image plane 24. Image plane 24 is coincident with object plane 25 for the zero order of diffraction when the refractive media in which the object and image lie is identical and both field lens 5 and concave diffraction grating 9 occupy the same center of curvature. It is appreciated that in the Dyson-type optical arrangement, the image plane and object plane need not be coplanar: they may be displaced relative to each other provided the optical path lengths for the object and image relative to the diffraction grating are essentially equal.

The media of the field lens 5 need not be of only one material; more than one material may be used provided the refractive indices of the materials are closely matched. Since it is typically desirable to limit the band-pass of the spectrometer to include only wavelengths of interest, filter 21 may replace a portion or all of field lens 5. Filter 21 is shown a single material but may include more than one material including interference coatings. Filter 21 is shown in the incident path to grating 9 but may also be included in the diffracted path or both. Filter 21 may also serve as a substrate for forming slit 19 thereon by electro-deposition. Filter 21 is placed in optical contact to field lens 5 using, for example, optical cement 31 or any appropriate material having a refractive index closely matched to those of filter 21 and field lens 5, such as, for example, immersion oil. Similarly, detector window 1a is attached to field lens 5 using optical cement 31. Detector 1 is typically packaged to include detector window 1a as obtained from the detector manufacturer. Detector element 37, contained within detector 1, and detector window 1a are typically separately affixed to the detector package of detector 1, and the detector package typically includes electrical connections 36 for operating the detector. Detector window 1a is placed in contact with field lens 5 using for example optical cement 31, or any material (e.g., immersion oil) closely matched in refractive index to detector window 1a and field lens 5. By closely matching the refractive indices of all interfaces between components, the stray light and internal reflections internal to the spectrometer may be minimized.

Image plane 24 is displaced from object plane 25 in an embodiment of the present invention, as shown in FIGS. 1A–1D and FIGS. 4A and 4B, due to the difference in refractive index of the region separating detector element 37 and detector window 1a. The media between detector element 37 and detector window 1a, which typically is air, nitrogen, argon, epoxy . . . etc., is so separated for practical reasons of detector manufacture such as electrical connections. The amount of displacement of image plane 24 from object plane 25 is related by formula d=t (n–n')/n, where d is the displacement, t is the thickness of the media between detector element 37 and detector window 1a, n is the index of refraction of the lens, and n' is the index of the media between detector element 37 and detector window 1a. For a medium of air between detector 37 and detector window 1a, image plane 24 is shifted inside the common radius of curvature of field lens 5 and concave diffraction grating 9. For diffraction orders other than zero, concave diffraction grating 9 may be displaced slightly from the common center of curvature of field lens 5 to compensate for asymmetry of the diffracted slit image through field lens 5 and manufacturing tolerances associated with the spectrometer optics.

Optical fibers 2 and entrance slit 19 together will hereinafter be referred to as the "entrance slit assembly." Optical fibers 2 may, for example, comprise five fibers, each having a core diameter of approximately 250 $\mu$m and being linearly arranged with an approximate 400 $\mu$m center-to-center distance. Optical fibers 2 are placed in contact with entrance slit 19 having dimensions of 10 $\mu$m×2400 $\mu$m to match the aperture of area array detector 1, thus forming the entrance slit assembly for concentric spectrometer 100. The entrance slit assembly provides regions of zero input sample energy, the regions between the fibers as well as the regions adjacent the outer two fibers, to enable measuring stray light with area array detector 1 and using the measured stray light signal for correction or compensation, as will be further described hereinbelow.

Area array detector 1 allows simultaneous measurement of multiple wavelengths, and a two-dimensional area array configuration is preferably used to measure the dispersion of each input (e.g., inputs corresponding to the five optical fibers 2 described above) of the entrance slit independently and simultaneously. It is understood that various types of detectors may be employed, such as CCDs (charge-coupled devices, either direct or indirect readout), CIDs (charge injection devices), multiplexed photodetector arrays, and APSs (active pixel sensors). An example of array detector 1 is the TC255 (a two-dimensional CCD array) made by Texas Instruments located in Dallas, Tex. Area array detector 1 simultaneously measures the dispersion spectra of interest and the stray light corresponding to the zero-input-sample-energy regions. For each input optical signal or zero-input signal, one or more pixels may be used (e.g., depending on detector type and design) in the cross dispersion direction to detect the signal for a given dispersion (i.e., wavelength). More particularly, although two-dimensional detector array 1 typically includes tens of pixels per wavelength per channel in the cross-dispersion direction, it is understood that two-dimensional detector array 1 may be provided by a plurality of linear arrays, each of which detects a single input optical radiation channel or zero-input radiation channel in the dispersion direction, each having a single pixel per wavelength along the cross-dispersion direction, the pixel width of each linear array being wide enough such that only a single pixel per wavelength per channel in the cross-dispersion direction is needed to collect sufficient signal and average out noise effects.

Preferably, in order to significantly reduce the measurement error of the dispersion spectra, the stray light measurement is essentially subtracted from the spectral energy along the dispersion axis, thus compensating for the stray light even if the stray light is non-uniformly distributed along the dispersion axis. Such processing may be implemented by a microprocessor or microcontroller coupled to detector 1 via array detector electrical leads 36 (e.g., sharing a common printed circuit board). Alternatively, detector 1 may incorporate an on-chip (i.e., on the substrate of detector element 37) processor such as, for example, where detector 1 is an active pixel sensor fabricated according to CMOS technology used to additionally implement the on-chip processing circuitry as well as any additional array control (e.g., readout control) circuitry.

As an example of correcting for stray radiant light within the spectrometer, the pixels for each channel (i.e., the channels including the regions of sample dispersion corresponding to the input fibers as well as the regions of zero input sample energy regions) of array detector 1 may first be summed in the cross-dispersion axis to form for each pixel row in the dispersion direction (i.e., for each wavelength) a vector having elements alternating between sample energy dispersion spectra components and zero-input-energy components. (For example, for five input fibers, a given vector may include six zero-input-sample-energy components and five sample-energy components). These vectors may be further convoluted with the slit function to form vectors of greater bandwidth than the original spectra of greater signal-to-noise ratio. The total number of pixels used to comprise a given zero-input-energy component need not be equal to the number of pixels contributing to a corresponding sample-energy vector component or to other zero-input-energy components of the same vector: each component may be appropriately normalized according to the number of pixels which contribute to it. It is understood that for such an embodiment of stray light correction, there are various ways of summing the pixels to form the vector components. For instance, each zero-input-energy vector component may alternatively consist of pixels summed in the cross-dispersion axis taken in equal amounts from both sides of an intervening sample spectra region. In any event, once vectors are formed corresponding to each row in the dispersion direction (each wavelength), for each vector a function of one or more of the zero-input-energy vector components are subtracted from each of the sample-energy vector components. For instance, for each (average) sample-energy component, an appropriately weighted (based on number of pixels) average of the two adjacent zero-input-sample-energy components or some fraction thereof (i.e., using a scaling factor) may be subtracted therefrom to reduce the effects of both overall bias due to scattered stray light and wavelength dependent stray light associated with the sample spectra caused by the reflection of the dispersion spectra off detector element 37 and detector window 1*a*.

It is appreciated that there are myriad alternative methods or algorithms which may be applied to correct or compensate the signals from stray light effects by using the detected zero-input-energy signals. Determining or selecting an appropriate algorithm to best compensate for the detected stray light may be based on first analyzing the distribution (e.g., in one or two dimensions of the spatial and/or transform domain) of stray light detected by array detector 1. For instance, if the detected stray light distribution were spatially uniform and random in the cross-dispersion direction, then an improved estimate of the stray light correction signal may be obtained by averaging over all zero-input-energy pixels in the cross-dispersion direction. Alternatively, where two-dimensional spatial correlation is present, a correction algorithm which accounts for such correlation may be used to determine a compensation/correction signal amount from the zero-input-energy pixels; for example, using a two-dimensional spatial weighting or convolution function within a neighborhood of pixels determined from the spatial distribution characteristics (e.g., correlation distance or spatial frequency components), with zero-input-energy pixel weighting based on the inverse of the average distance between the zero-input-energy pixel and input-signal pixels which comprise a sample-energy vector component to be corrected. It may be further appreciated that such compensation or correction is not limited to determining for each input sample-energy component a single value to subtract (or add) to an average sample-energy vector component value, but that such processing may be applied to correct or compensate individual sample-energy pixels which may then be averaged to provide an average sample-energy signal. It is further appreciated that such stray light correction or compensation is preferably applied in addition to conventional background noise suppression methods such as, for example, standard methods to correct fixed pattern noise in two dimensional array detector 1.

Figure 5A:
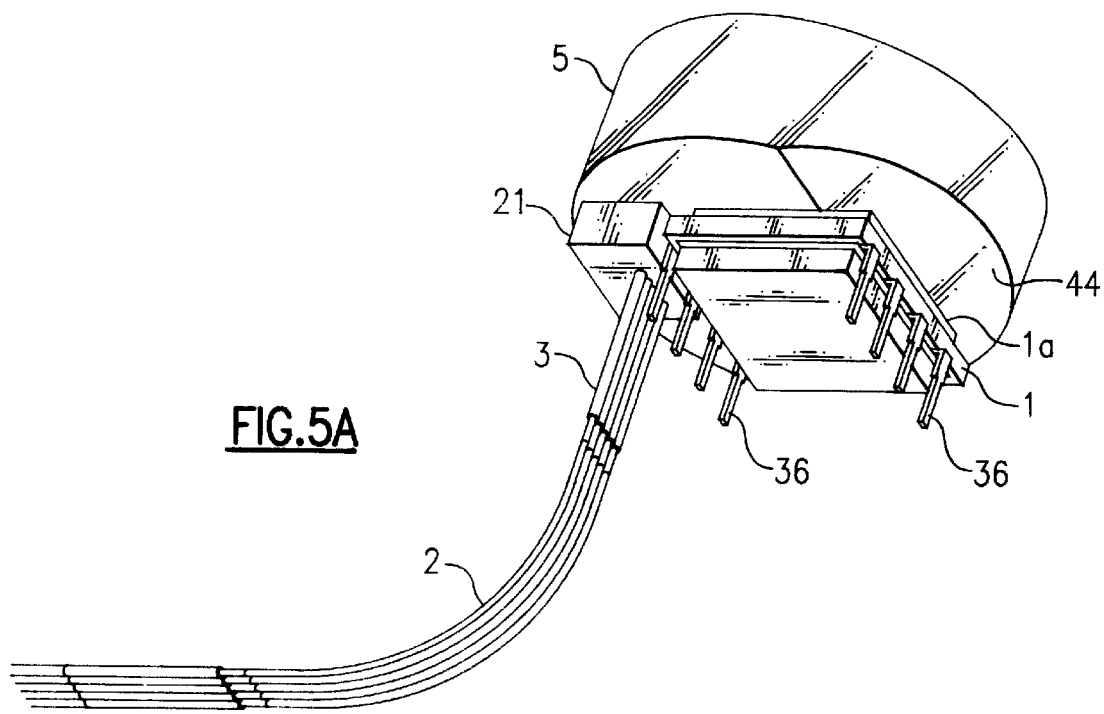
FIG. 5A is an isometric views of various components of the optical system depicted in FIGS. 1A–1D and schematically represented in FIG. 4A and in FIG. 4B, in accordance with an embodiment of the present invention.
Figure 5B:
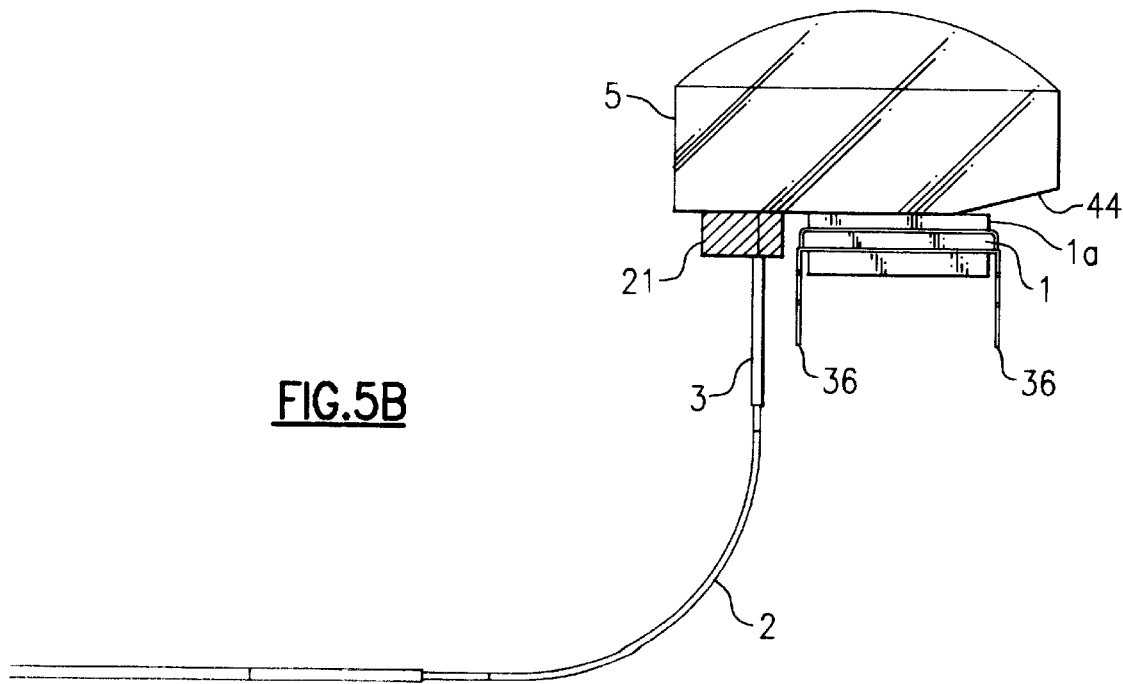
FIG. 5B is a side view of various components of the optical system corresponding to FIG. 5A, in accordance with an embodiment of the present invention.

In accordance with the present invention, the embodiment shown in FIG. 1A–1D preferably includes a light trap structure 44 in the design of field lens 5. Light trap 44, and its relationship to detector 1, are shown more clearly in FIGS. 5A and FIG. 5B, which are isometric and side views, respectively, of various components of the optical system implemented in FIGS. 1A–1D and represented in FIG. 4A and in FIG. 4B. Light trap 44 is a surface specifically designed to mitigate or eliminate stray light due to light incident on the exit aperture region but which does not impinge on detector active area 18 (e.g., including light associated with the zero diffraction order, and orders of non-interest), and is a surface which preferably includes a combination of beveling, light absorbing media, and diffuse (e.g., substantially non-specular) reflecting characteristics. More specifically, in the embodiment of FIGS. 1A–1D, and as further illustrated in FIGS. 5A and 5B, light trap 44 is formed by beveling a portion of the planar surface of plano-convex field lens 5 in the exit aperture region external to the region through which diffracted light to be detected as a signal of interest passes (e.g., not disposed over detector active area 18). As shown, by way of example, the line of intersection between the bevel plane and the planar surface of plano-convex field lens 5 is oriented along the direction of cross-dispersion direction axis 40 and aligned approximately (e.g., evenly, overlapping, or spaced away) with the edge of active area 18. The angle between these planes (shown by way of example as approximately 15 degrees) is selected to eliminate and/or substantially reduce the possibility for light reflected from the beveled surface of field lens 5 to impinge onto detector active area 18 after being reflected from the convex surface of field lens 5 or diffracted from diffraction grating 9. It is further understood that the deleterious effects of stray light due to reflections from light trap 44 are also mitigated because any incident light which scatters from the beveled interface of light trap 44 is not focussed relative to the concentric optical system. Preferably, the beveled surface is also coated with an optically absorbant material (e.g., black paint or pigment) to minimize reflections therefrom, and further is preferably rough (e.g., ground coarsely, not polished smoothly) to provide diffuse (non-specular) reflection for any light which does scatter therefrom.

Figure 6A:
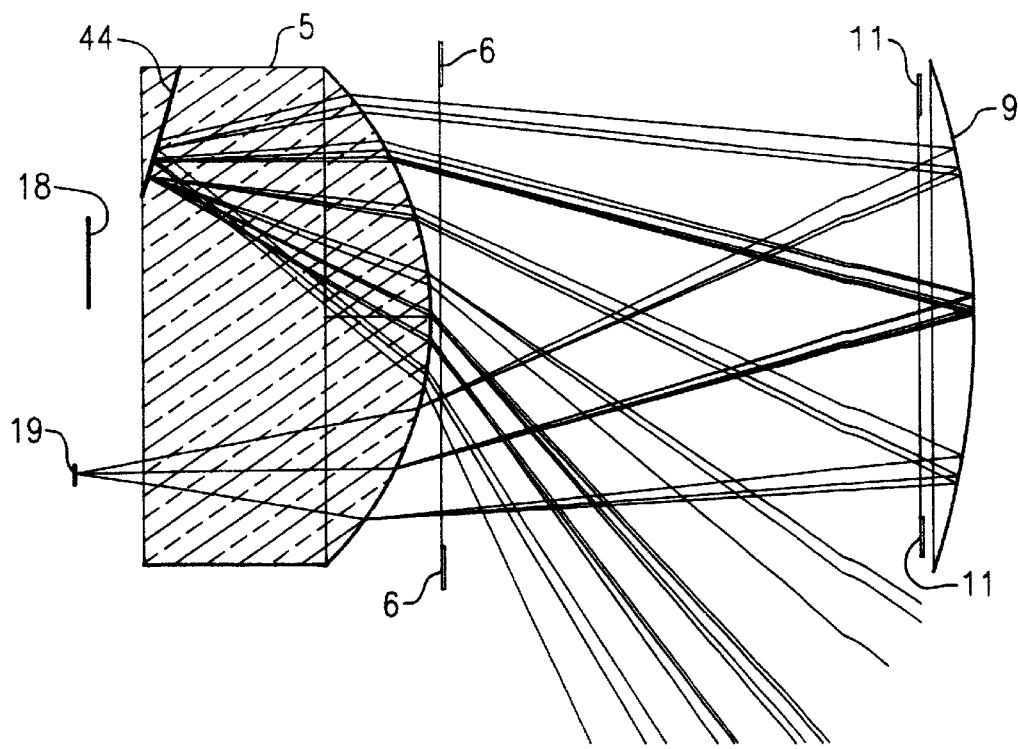
FIGS. 6A–C each schematically illustrate ray traces for zero-order radiation striking a light trap structure included in the optical configuration represented in FIGS. 1A–1E and FIGS. 4A–B, in accordance with an embodiment of the present invention.
Figure 6B:
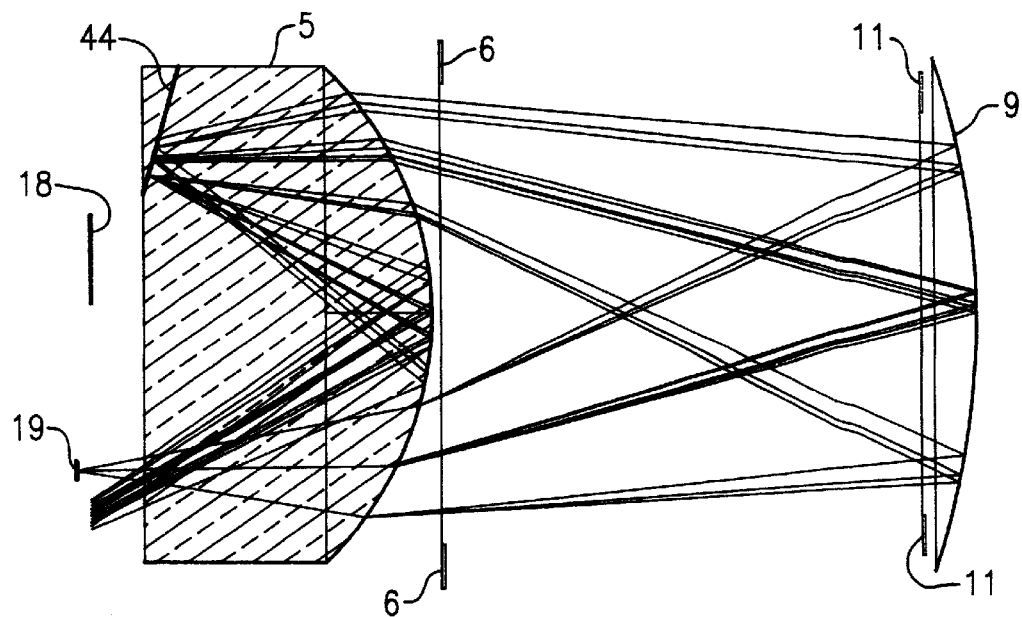
Figure 6C:
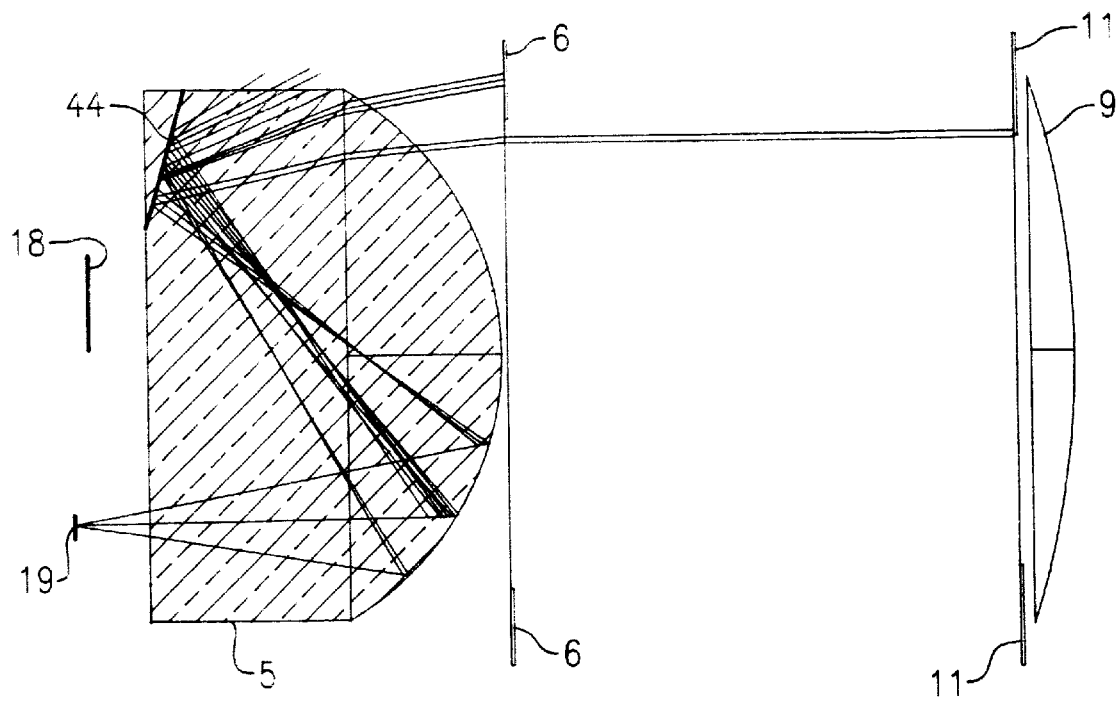

FIGS. 6A–C schematically illustrate in more detail how light trap structure 44 mitigates or prevents the deleterious effects of and/or attenuates specular reflections within the spectrometer. In these figures, inner portions of flexure mount 6 and optical stop 11 are schematically depicted for clarity of exposition. FIG. 6A shows ray traces for the zero order radiation striking light trap structure 44 and subsequent reflected specular energy as it is directed through field lens 5 toward the black inside surface of flexure mount 6. Flexure mount 6 may be, for example, molded in a black, light absorbent material such as Noryl, or machined from aluminum then coated black on the inside surface. Generally, the material for flexure mount 6 is selected based on such mechanical properties as elasticity, rigidity, thermal stability, etc. FIG. 6B shows ray traces for the zero-order radiation striking light trap structure 44 of lens 5 and the subsequent reflected specular energy, which is greatly reduced by the absorbance at light trap structure 44, and which is then reflected off the inside surface of the convex surface of field lens 5 and directed away from entrance slit 19. FIG. 6C shows the primary reflection of the inbound light from entrance slit 19 as it is reflected from the inside convex surface of field of lens 5 and directed to light trap structure 44 of field lens 5. Specular reflections from light trap structure 44 of field lens 5 are then directed mainly toward the edge of field lens 5 which preferably is also coated with a light absorbent coating to further attenuate stray light signals.

It is appreciated that without light trap structure 44, the zero-order energy would be reflected back on itself at the plano surface of field lens 5, to grating 9, to be imaged out of focus at entrance slit 19. This large, out-of-focus image of entrance slit 19 effectively would result in a second entrance source as it is reflected off the entrance slit substrate surface to be imaged at the detector as an out-of-focus secondary spectrum, adding many undesirable wavelengths to the primary spectra of interest and thus reducing the to signal-to-noise ratio.

Referring again to FIG. 1C and FIGS. 4A and 4B, in accordance with a preferred embodiment of the present invention, the location of the detector active area 18 (which corresponds, in these embodiments, to the spectrometer exit aperture) and the entrance slit 19 are preferably selected relative to the plane defined by the optical axis and the dispersion direction axis such that there is a non-direct optical path therebetween. For example, as shown in FIG. 1C, detector active area 18 and entrance slit 19 are situated in planes parallel to each other and in opposite diagonal quadrants about optical axis 23 with respect to dispersion direction axis 38 and cross-dispersion direction axis 40 (i.e., their respective locations each have a non-zero cross-dispersion direction axis 40 component). Stated alternatively, detector active area 18 and entrance slit 19 are not situated in the plane defined by optical axis 23 and dispersion direction axis 38. Detector active area 18 is optically coupled to the exit aperture of the concentric optical arrangement which provides the dispersion energy to be detected or sensed (and in the embodiment of FIGS. 1A–1D and FIGS. 4A and 4B is located adjacent to, and displaced along a straight line extension of the optical path from, the exit aperture).

It is understood that an exit aperture of a spectrometer (e.g., spectrometer 100) generally refers to the region of the optical system of the spectrometer from which dispersed energy (generated by the spectrometer), at least a portion of which is to be sensed or detected, emanates. Similarly, it is also understood that the exit aperture does not specifically require the presence of an aperture (i.e., an optically transparent region bounded by an optically opaque region) per se, but generally refers to the region of the spectrometer optical element(s) which provide and are traversed by the energy-dispersed (e.g., diffracted) optical radiation which is to be at least partially detected or sensed by a detector or sensor (e.g., region of planar surface of field lens 5 onto which dispersed energy impinges, the dispersed energy corresponding to an optical radiation signal input at the entrance aperture and which traverses the non-direct optical path). It is further understood that the exit aperture need not be adjacent, and in a straight-line optical path relationship to, a detector or sensor; additional optical elements (e.g., a mirror) may direct dispersed energy that emanates from the exit aperture to a detector or sensor that is not physically adjacent to and/or not in a straight-line optical path relationship to the exit aperture. Accordingly, it may be appreciated that, in accordance with an embodiment of the present invention, a non-direct optical path is provided between the entrance aperture (e.g, entrance slit 19) and exit aperture of spectrometer 100.

As a result of the diagonal arrangement of the entrance and exit apertures about the optical axis with respect to the dispersion direction of the concentric optical configuration of spectrometer 100, the dispersion spectra of any dispersion order that can be generated from optical radiation entering entrance slit 19 does not impinge upon entrance slit 19. Thus, in accordance with the present invention, a major reflection source is eliminated. More specifically, there is a non-direct optical path between the entrance aperture (e.g., entrance slit 19) and the exit aperture such that the dispersion energy (including all non-zero diffraction orders) which is emergent from diffraction grating 9 as a direct result of optical radiation entering entrance slit 18 and being guided along the optical path (by lens 5 for the present embodiment) to the energy-dispersive element (e.g., diffraction grating 9) cannot propagate in a direction away from the energy-dispersive element (e.g., diffraction grating 9) which would result in incidence onto entrance slit 19 and consequently would become re-imaged upon the detector. Thus, a reduction in the scattered stray light received by detector active area 18 is realized.

It may be understood, however, that such orientation of entrance slit 19 and the exit aperture may not be necessary in accordance with alternative embodiments of the present invention. In certain applications, for instance, entrance slit 19 and the exit aperture may be oriented along the plane defined by optical axis 23 and dispersion direction axis 38, and sufficient noise reduction may be provided by applying the hereinabove described stray light correction techniques based on using two-dimensional area array detector 1 to measure both dispersion spectra signals of interest and zero-input-sample-energy signals and/or by applying the hereinabove described light trap structure 44.

The ensuing description of the optical configurations shown in FIG. 3B and FIGS. 7–9 is presented to provide illustrative optical system variations, modifications, and alternate and/or additional features that may be employed in various or alternative embodiments of Mertz-type spectrometers in accordance with the present invention, and also to provide further description and understanding of various features included in the hereinabove described embodiment illustrated in FIG. 4A and FIG. 4B.

Figure 3B:
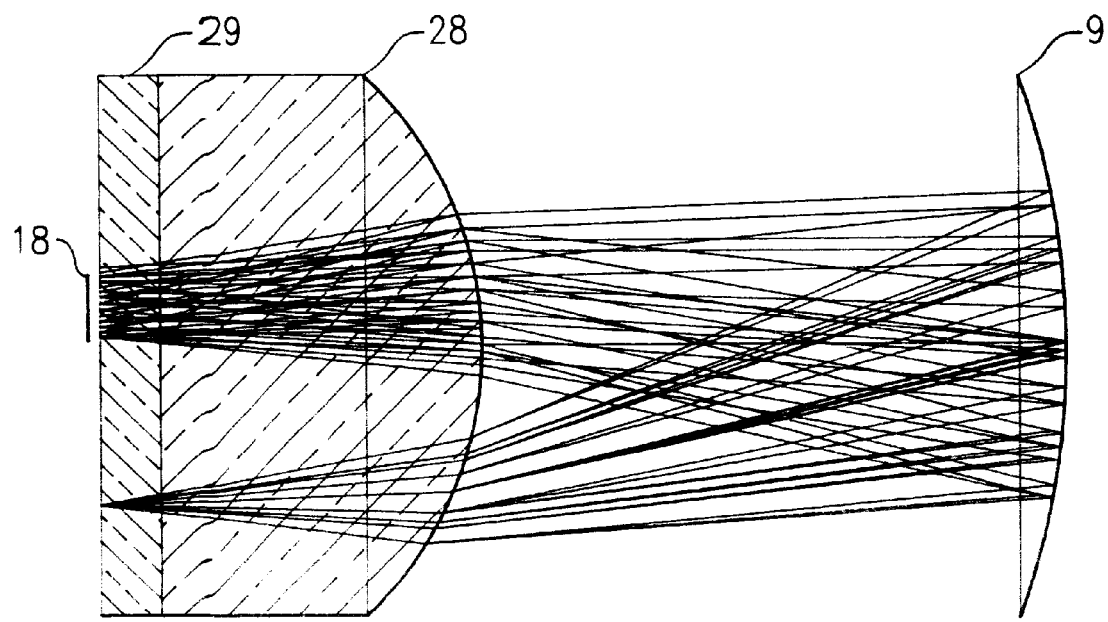
FIG. 3B illustrates a Mertz concentric spectrometer optical configuration modified to form a doublet, in accordance with an embodiment of the present invention.

In accordance with an embodiment of the present invention, FIG. 3B shows a modification of the concentric optical system of FIG. 3A by the addition of optical filter 29 to plano-convex field lens 45 to form doublet 28, which does not degrade the image quality provided by the Mertz optical configuration (as may be appreciated by analogy to the hereinabove described modification shown in FIG. 2B of the conventional Dyson optical configuration of FIG. 2A). The optical path through doublet 28 is such that a double pass is made through optical filter 29, thus preventing all but the wavelengths of interest from to reaching detector active area 18 of detector element 37 (e.g., semiconductor detector chip). Alternatively, field lens 5 material may have a different wavelength cut-off from optical filter 29 and will either enhance the cut-off of optical filter 29 or will further restrict the wavelengths which may pass through doublet 28 by narrowing the passband. Optical filter 29 further reduces the amount of available stray light impinging on detector active area 18. Accordingly, it is understood that compared to conventional spectrometers this configuration provides enhanced the performance (e.g., higher quality output spectra) by decreasing the amount of stray radiant energy present within the spectrometer.

Figure 7:
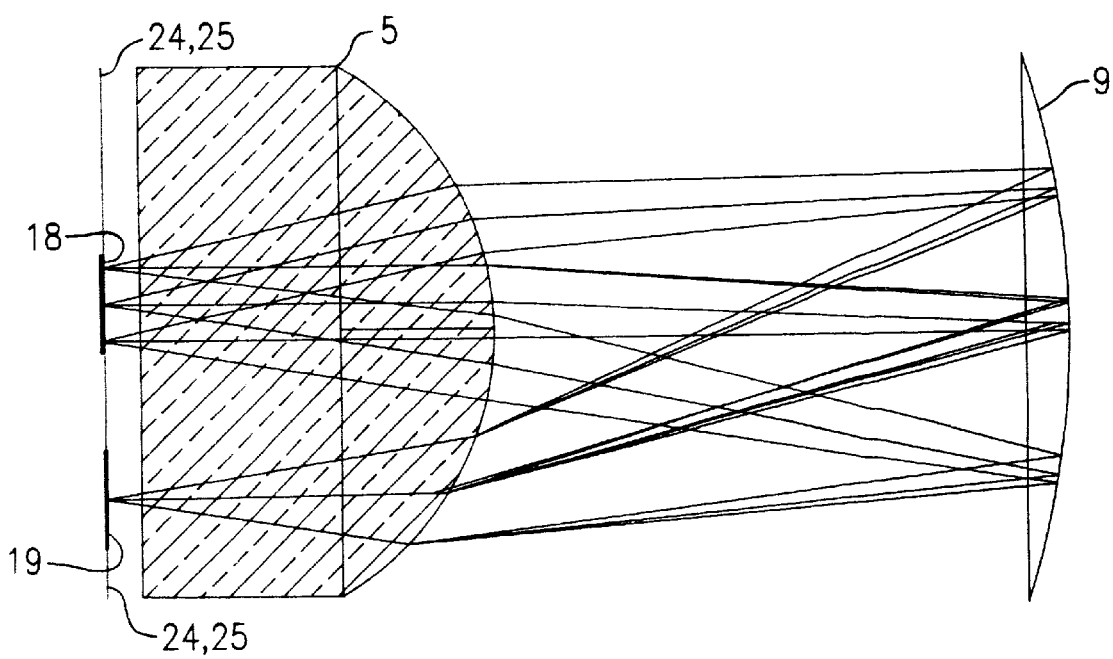
FIG. 7 illustrates an alternative embodiment of an optical configuration in the dispersion direction and optical axis dimensions, in accordance with an alternative embodiment of the present invention.

In another embodiment of an optical configuration according to the present invention shown in FIG. 7 in the dispersion direction and optical axis dimensions, entrance slit 19 and detector active area 18 of detector element 37 are separated from field lens 5. Field lens 5 may be with or without optical filter 29 forming doublet 28 for restriction of band pass to the detectable wavelengths of interest as previously described. Entrance slit 19 may be in a form of a narrow tall aperture such as an air slit. Grating 9 and field lens 5 remain monocentric as both occupy a common center of curvature. Detector 1 image plane 24 and entrance slit 19 object plane 25 lie in a single plane parallel to the plano surface of field lens 5; image plane 24 and object plane 25 are coincident or coplanar. For a given radial displacement from the center of curvature of image plane 24 and object plane 25, the thickness of field lens 5 and the radius of curvature are modified from the on-center Dyson concentric conditions that yield a reduced curvature of $R_l = [(n-1)]*R_g$ where $R_l$=the curvature of the lens, n=the refractive index of the lens material, $R_g$=the radii of the grating or mirror. The result of the radial displacement of image plane 24 and object plane 25 is a radius of curvature for field lens 5 greater than that of the Dyson condition on-center by reference. The radius of curvature and subsequent field lens 5 thickness and the position of the monocentric point of grating 9 and field lens 5 are adjusted along the optical axis 23 for best focus at the image plane 24. The thickness of field lens 5 is further modified from its single media thickness to a high degree of accuracy by $t_l' = t_l - t_g (n/n')$; where $t_l'$ is the new lens thickness, $t_l$ is the original lens thickness, $t_g$ is the thickness of the media in which detector element 37 and entrance slit 19 dwell, n is the refractive index of the field lens, and n' is the media in which the entrance slit 19 and detector element 37 dwell. The position of the center of curvature of both the field lens 5 and grating 9 is thus located at $t_l-r_l$; where $r_l$ is equal to the radii of field lens 5.

Figure 8:
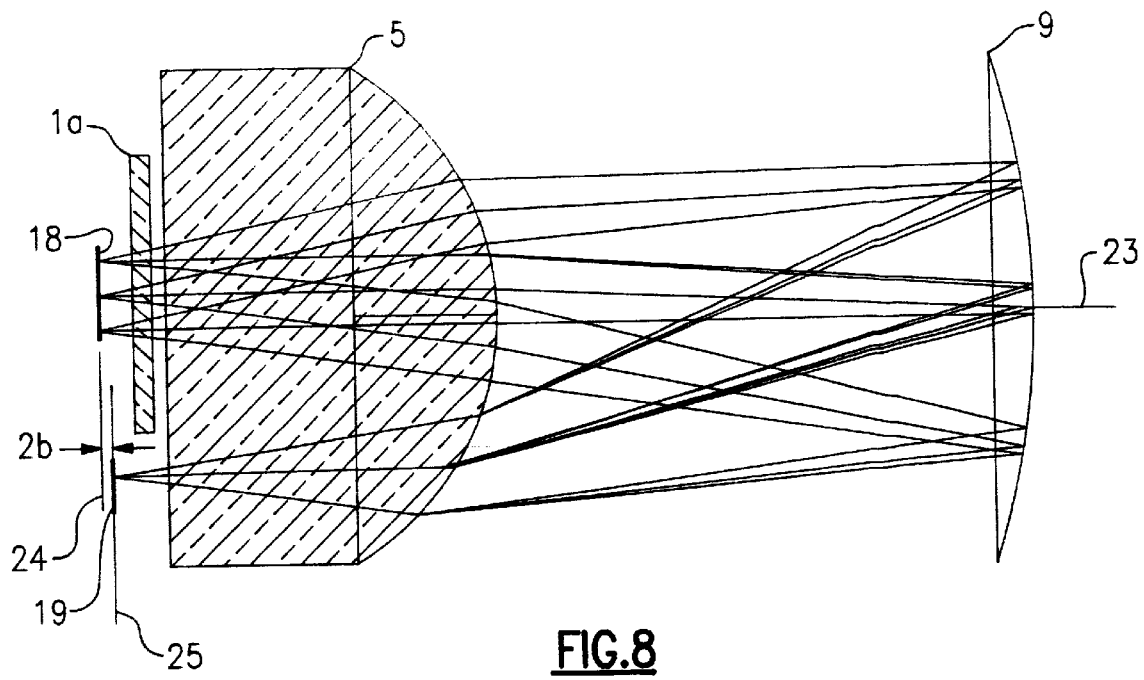
FIG. 8 illustrates another alternative embodiment of an optical configuration in the dispersion direction and optical axis dimensions, in accordance with an alternative embodiment of the present invention.

In another embodiment of an optical configuration according to the present invention shown in FIG. 8 in the dispersion direction and optical axis dimensions, detector element 37 is covered by detector window 1a. Detector active area 18 of detector element 37 is separated from detector window 1a for practical reasons of detector manufacture such as wire bond requirements, cleanliness, moisture barrier, etc, and the amount of separation is determined by the detector manufacturer. Detector window 1a need not be in contact with field lens 5. The sum of the separation of field lens 5 to detector window 1a plus the separation of detector active area 18 to detector window 1a retains the relationship defined previously in FIG. 7 when the media of both separations is the same. Image plane 24 is displaced from object plane 25 (by separation distance 26) due to the insertion of detector window 1a in the dispersion path but not in the incident path. The amount of displacement is equated by $d=t(n-n')/n$; where d is the displacement, t is the thickness of detector window 1a, n is the refractive index of detector window 1a, and n' is the refractive index in which the entrance slit 19 and detector element 37 dwell. Thus, the new position of image plane 24 is equal to $d+p_o$; where $p_o$ is the position of object plane 25. This configuration has the disadvantage that it introduces two glass to air interfaces that cause an increase in the stray light impinging on the detector caused by reflections due to the refractive index difference between lens 5 and air, and air and detector window 1a.

Figure 9:
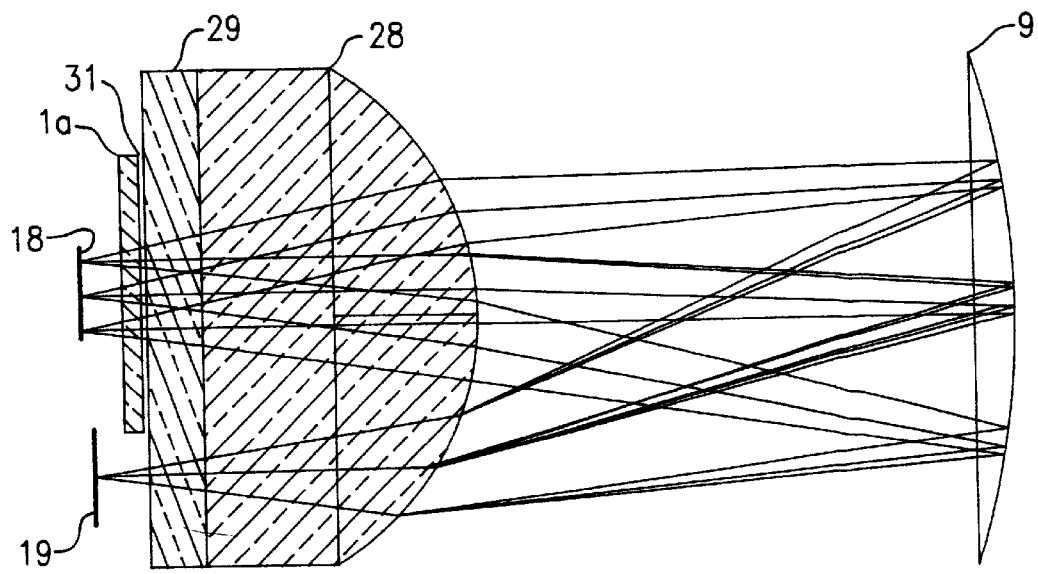
FIG. 9 illustrates yet another alternative embodiment of an optical configuration in the dispersion direction and optical axis dimensions, in accordance with an alternative embodiment of the present invention.

In yet another embodiment of an optical configuration according to the present invention shown in FIG. 9 in the dispersion direction and optical axis dimensions, detector window 1a is placed in optical contact to the plano surface of doublet 28, optical filter 29, with optical cement or immersion oil 31. The refractive indices of cement or immersion oil 31, optical filter 29, and detector window 1a are closely matched to minimize the number of reflections and the amount of stray light generated at the surfaces of the plano side of field lens 5 and the external surface or the detector window 1a. This variation corresponds to the embodiment of FIG. 3B, but with the additional variation that the object and image planes are not necessarily coplanar with each other or with the planar surface of plano-convex field lens 5.

Figure 10A:
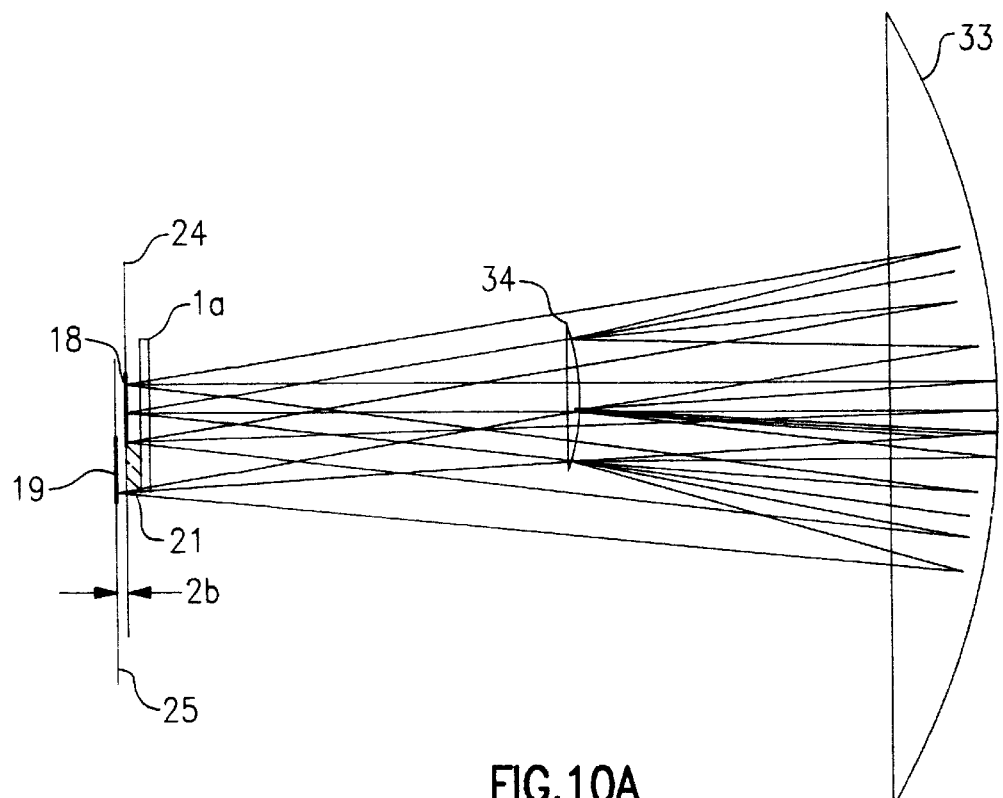
FIG. 10A shows a schematic side view in the dispersion direction and optical axis dimensions for an Offner-type optical configuration, in accordance with an another embodiment of the present invention.
Figure 10B:
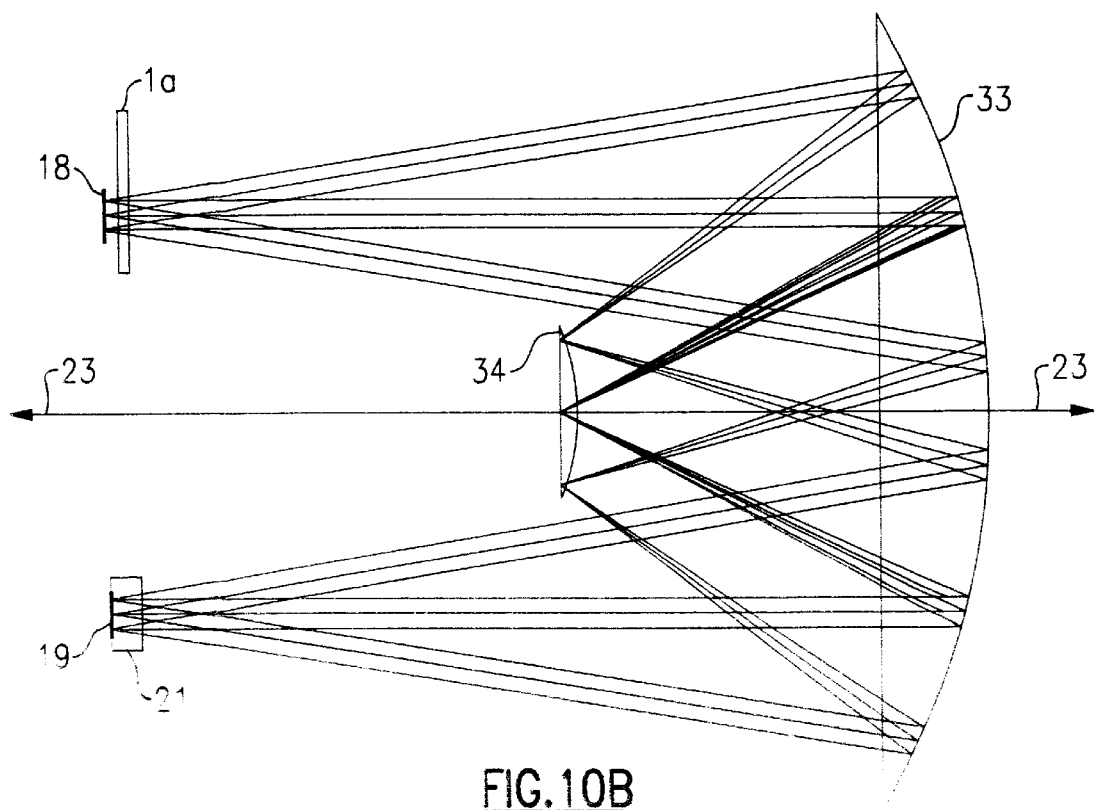
FIG. 10B shows a schematic side view in the cross-dispersion direction and optical axis dimensions for the Offner-type optical configuration of FIG. 10A, in accordance with the present invention.
Figure 10C:
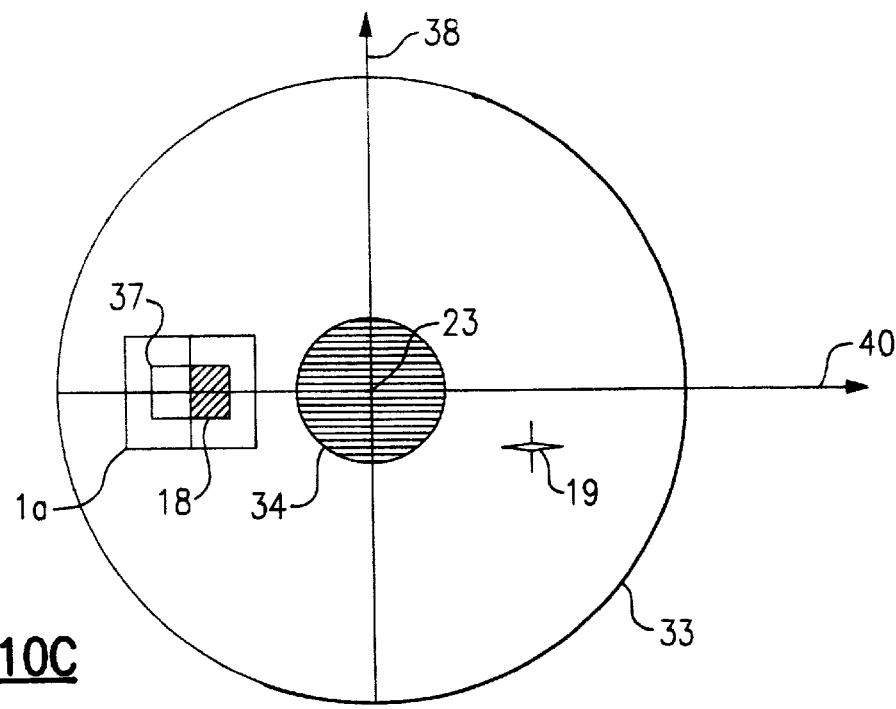
FIG. 10C is a plan view schematically illustrating the optical configuration of FIG. 10A and FIG. 10B in the dispersion direction axis and cross-dispersion direction axis dimensions, in accordance with the present invention.
Figure 11:
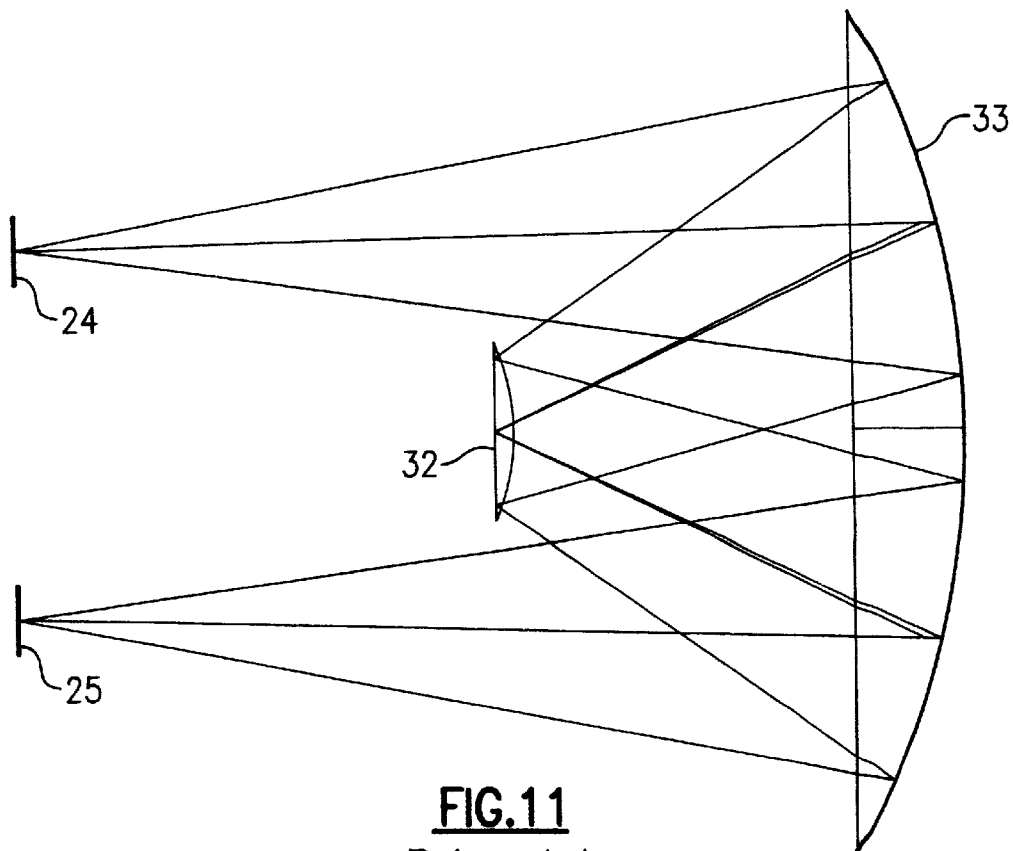
FIG. 11 illustrates a prior art monocentric optical configuration disclosed by Offner.

Referring now to FIGS. 10A–10C, there is shown an alternative embodiment of implementing a concentric spectrometer according to the present invention, wherein optical components are arranged in an all-reflecting, self-corrected unit magnification concentric form as described by A. Offner in "New Concepts in Projection Mask Aligners," Optical Engineering, Vol. 14, page 130, 1975, which is incorporated by reference herein. FIG. 11 illustrates the basic, monocentric optical configuration of convex mirror 32 and concave mirror 33 disclosed by Offner. In implementing a concentric spectrometer in accordance with the present invention, as shown in FIGS. 10A–10C, a convex diffraction grating 34 with equally spaced parallel grooves is substituted for convex mirror 32 of the Offner reference. FIG. 10A and FIG. 10B show schematic side views in the dispersion direction/ optical axis dimensions and cross-dispersion direction/ optical axis dimensions, respectively, for the Offner-type optical configuration, and show the concentric arrangement of concave mirror 33 and convex diffraction grating 34. Area array detector 1 and entrance slit 19 form a plane coincident with the common radius of curvature of convex diffraction grating 34 and concave mirror 33 when the refractive indices within the spectrometer are constant.

FIG. 10C is a plan view schematically illustrating the optical configuration of FIGS. 10A and FIG. 10B in the dispersion direction axis 38 and cross-dispersion direction axis 40 dimensions, and shows a preferred position of entrance slit 19 and area array detector 1. As for the previous embodiments, dispersion direction axis 38, cross-dispersion direction axis 40, and optical axis 23 are shown for purposes of clarity of exposition: dispersion direction axis 38 is oriented in the direction of dispersion and located to intersect optical axis 23, and cross-dispersion direction axis 40 is perpendicular to dispersion direction axis 38 and to optical axis 23 and is located to intersect optical axis 23. Entrance slit 19 is shown diagonally opposed to area array detector 1 about optical axis 23 (which is normal to the page in FIG. 10C) relative to dispersion direction axis 38 (i.e., their respective locations each have a non-zero cross-dispersion direction axis 40 component). Stated alternatively, detector 1 (e.g., active area of detector 1) or the exit aperture (the region through which diffracted light impinges onto area array detector 1) and entrance slit 19 are not situated in the plane defined by optical axis 23 and dispersion direction axis 38. Such an orientation of the entrance aperture (e.g., entrance slit 19) and exit aperture relative to optical axis 23 and dispersion direction axis 38 is such that the dispersion spectra of any dispersion order emergent from diffraction grating 34 as a result of incidence thereon of optical radiation directed thereto from the entrance aperture by the optical configuration does not impinge upon the entrance slit 19 and consequently become re-imaged upon the detector (i.e., the optical path is non-direct). This embodiment is otherwise similar to the Dyson-type (Mertz) optical embodiments described above, and the description of the displacement between object plane 25 and image plane 24 (as indicated by separation distance 26) thereof will not be repeated here for brevity and clarity of exposition. It may be appreciated that the Offner-type and Dyson-type (Mertz) optical configurations described hereinabove are illustrative of optical configurations which may be employed in accordance with the present invention in order to provide a non-direct optical path between the entrance aperture and exit aperture: other optical configurations which have a large field, and preferably are well corrected for third order aberrations, such that different parts of the available field may be used to provide a non-direct optical path that precludes dispersion energy from impinging on the entrance aperture (which would form multiple or re-entrant spectra) may also be implemented in accordance with the present invention.

As may be appreciated from the above embodiments, and as may be further understood by practicing the present invention, many advantages and attendant advantages are provided by the present invention. A concentric spectrometer according to the present invention has a reduced amount of stray light and re-entrant spectra reaching the output plane, achieved employing an area array detector for stray light compensation/correction, an offset entrance aperture/ exit aperture, and a light trap structure. The area array detector allows for simultaneous acquisition of multiple spectra signals and stray light signals. High-quality imaging also results from the use of the Dyson and Offner optical configurations which eliminate third-order aberrations Linear dispersion is provided by judiciously selecting optical materials. The present invention, as may be appreciated from the disclosed embodiments, also provides for a compact, portable design suitable for field applications.

These advantages render the present invention particularly useful for color matching and precise color determination in a wide variety of commercial applications, for example the automotive, aerospace, and home improvement industries. It is also understood that a concentric spectrometer according to the present invention may be designed for accurate determination of color in various spectral regions, such as the near-ultraviolet (UV), visible, and near-infrared (IR) spectral regions.

Although the above description of illustrative embodiments of the invention, and various modifications thereof, provides many specificities, these enabling details should not be construed as limiting the scope of the invention, and it will be readily understood by those persons skilled in the art that the present invention is susceptible to many modifications, adaptations, and equivalent implementations without departing from this scope and without diminishing its attendant advantages. It is therefore intended that the present invention is not limited to the disclosed embodiments but should be defined in accordance with the claims which follow.

We claim:

1. A spectrometer comprising:
   an entrance aperture through which an optical radiation signal is received;
   an exit aperture; and
   an optical system that is monocentric and has a dispersion element, and that directs said optical radiation signal along a non-direct optical path from said entrance aperture to said exit aperture via said dispersion element which disperses said optical radiation signal according to wavelength.

2. The spectrometer according to claim 1, wherein said non-direct optical path is such that any dispersed radiation emergent from said dispersion element as a result of incidence on said dispersion element of said optical radiation being directed by said optical system to said dispersion element from said entrance aperture along said non-direct optical path does not impinge on said entrance aperture.

3. The spectrometer according to claim 1, wherein said optical system is symmetric about an optical axis, wherein said dispersion element spatially disperses said radiation according to wavelength along a dispersion direction, and wherein said entrance aperture and exit aperture are separated from and located on opposite sides of a plane which contains said optical axis and is parallel to said dispersion direction, thereby providing said non-direct optical path therebetween.

4. The spectrometer according to claim 1, wherein said optical radiation signal includes a plurality of optical input signals concurrently input into said entrance slit.

5. The spectrometer according to claim 4, wherein said entrance aperture is elongated to form an entrance slit and said plurality of optical signals are linearly oriented along said entrance slit.

6. The spectrometer according to claim 4, further comprising a plurality of optical fibers optically coupled to said entrance aperture, each optical fiber providing a respective one of said plurality of optical input signals.

7. The spectrometer according to claim 6, wherein said plurality of optical fibers are linearly oriented, and wherein regions of zero input radiation are between the fibers.

8. The spectrometer according to claim 1, wherein said optical system includes a spherical plano-convex lens, said dispersion element is a spherical concave diffraction grating, and wherein said spherical plano-convex lens and said spherical concave diffraction grating have coincident centers of curvature.

9. The spectrometer according to claim 1, wherein said optical system includes a concave mirror, said dispersion element is a convex diffraction grating, and wherein said concave mirror and convex diffraction grating have coincident centers of curvature.

10. The spectrometer according to claim 1, wherein said optical system provides linear dispersion of said optical radiation signal.

11. The spectrometer according to claim 1, wherein said optical system includes an optical filter.

12. The spectrometer according to claim 1, further comprising a detector optically coupled to said exit aperture to detect at least a portion of said optical radiation signal directed by said optical system to said exit aperture.

13. The spectrometer according to claim 12, wherein said entrance aperture is displaced from a predetermined plane to compensate for a corresponding displacement of the active area of said detector.

14. The spectrometer according to claim 1, wherein said optical system includes a lens, said dispersion element is a grating, and said lens has a radius of curvature greater than that for an image and object plane near a center of curvature given by the formula $R_l=[(n-1)/n]R_g$, wherein $R_l$ is the radius of curvature of said lens, n is the refractive index of the material of said lens, and $R_g$ is the radius of curvature of said grating.

15. The spectrometer according to claim 12, wherein said optical system includes a refractive element and wherein said detector is placed in direct contact with said refractive element.

16. The spectrometer according to claim 12, wherein said optical system includes a light trap structure such that at least a portion of any of said optical radiation which traverses said non-direct optical path from said entrance aperture to said exit aperture and which impinges on said exit aperture along a direction not incident on said detector does not impinge on said entrance aperture by traversing said optical path in an opposite direction.

17. The spectrometer according to claim 16, wherein said optical system includes a spherical plano-convex lens which includes said light trap structure.

18. The spectrometer according to claim 17, wherein the planar surface of said plano-convex lens includes a bevel to provide said light trap structure.

19. The spectrometer according to claim 18, wherein said light trap structure includes a material that substantially absorbs optical radiation incident thereon.

20. The spectrometer according to claim 17, wherein said light trap structure includes a surface which provides substantially diffuse reflection for any optical radiation reflected therefrom.

21. The spectrometer according to claim 12, wherein the detector is a two-dimensional detector.

22. The spectrometer according to claim 21, wherein said optical radiation signal includes a plurality of optical input signals concurrently input into said entrance slit, and said two-dimensional detector is capable of concurrently detecting said plurality of optical input signals directed by said optical system to said exit aperture.

23. The spectrometer according to claim 22, wherein said optical radiation signal includes at least one region of zero input radiation input into said entrance slit concurrently with said plurality of optical input signal so, said two-dimensional detector capable of concurrently detecting said plurality of optical input signals and a signal corresponding to said zero input radiation region directed by said optical system to said exit aperture, the spectrometer further comprising a processor that corrects or compensates at least one detected said optical input signals according to said signal corresponding at least one region of zero input radiation.

24. The spectrometer according to claim 23, wherein said processor and said two-dimensional detector are both located on a common semiconductor substrate.

25. The spectrometer according to claim 21, wherein the two-dimensional detector is an area array of pixels located on a common semiconductor substrate.

26. A spectrophotometer comprising the spectrometer according to claim 1.

27. A method for correcting or compensating at least one spectral signal detected by a spectrometer which includes a two-dimensional detector, said method comprising the steps of:
  sensing with said two-dimensional detector said at least one spectral signal and at least one zero-input radiation signal, each of said at least one spectral signal representing dispersion according to wavelength by the spectrometer of a respective input optical radiation signal coupled into the spectrometer, said zero-input radiation signal sensed at all area of said two-dimensional detector exterior to any region that detects any said input optical radiation signal input into the spectrometer;
  processing said optical radiation signal and said zero-input radiation signal to correct said optical radiation signal.

28. The method according to claim 27, wherein a plurality of said input optical radiation signals are concurrently coupled into an entrance aperture of the spectrometer, and said at least one zero-input radiation signal corresponds to at least one region between said input optical radiation signals at the entrance slit.

29. The method according to claim 28, wherein said entrance aperture is elongated to form an entrance slit and said plurality of input optical signals are linearly oriented along said entrance slit.

30. The method according to claim 28, wherein each of said plurality of said input optical radiation signals is coupled into said entrance aperture via a respective one of a plurality of optical fibers.

31. The method according to claim 30, wherein said plurality of optical fibers are linearly oriented, and wherein said at least one zero-input radiation signal corresponds to at least one region between said optical fibers.

32. The method according to claim 27, wherein said processing step includes the step of analyzing said optical radiation signal in order to select a processing routine for correcting said at least one spectral signal.

33. The method according to claim 27, wherein the dispersion according to wavelength of each said at least one spectrum signal is detected by a contiguous set of pixels along a first dimension of said two-dimensional detector, each said at least one zero-input radiation signal detected by a contiguous set of zero-input pixels along said first dimension, and wherein said processing step includes the step of correcting a signal sample detected by a first pixel of said contiguous set of pixels according to a function of a zero-input signal sample detected by a second pixel of said zero-input pixels, said second pixel displaced from said first pixel in a second dimension perpendicular to said first dimension, and said first and second pixels having equal displacements relative to the first dimension.

34. The method according to claim 33, wherein said function is also a function of a zero-input signal sample detected by a third pixel of said zero-input pixels, said third pixel displaced from said second pixel in said first dimension.

35. The method according to claim 33, wherein said function is also a function of a zero-input signal sample detected by a third pixel of another of said contiguous set of zero-input pixels along said first dimension, said third pixel and said second pixel being located on opposite sides of said first pixel in said second dimension and having equal displacements relative to the first dimension.

36. The method according to claim 27, wherein said at least one spectrum signal is detected by a pixel array of said two-dimensional detector, said pixel array having columns of adjacent pixels arranged along a first direction of the dispersion according to wavelength and rows of adjacent pixels in a second direction perpendicular to said first direction, each said at least one zero-input radiation signal detected by a zero-input pixel array having columns of adjacent pixels arranged along said first direction and rows of adjacent pixels in the second direction, and wherein said processing step includes the step of correcting a first function of signal samples detected by a first row of pixels of said pixel array according to a second function of zero-input signal samples detected by a second row of pixels of said zero-input pixel array, said first row and said second row displaced in the second dimension and displaced equally with respect to the first dimension.

37. The method according to claim 36, wherein said first function represents a sum or average of signal samples detected by the first row of pixels, and said second function represents a sum or average of zero-input signal samples detected by the second row of pixels.

38. The method according to claim 36, wherein said first function is also a function of a third row of zero-input signal samples detected by the zero-input pixel arrays, said third pixel displaced from said second pixel in said first dimension.

39. The method according to claim 33, wherein said function is also a function of a zero-input signal sample detected by a third row of pixels of another zero-input pixel array, said third row of pixels and said second row of pixels being located on opposite sides of said first row of pixels in said second dimension.

40. The method according to claim 27, wherein the two-dimensional detector is an area array of pixels located on a common semiconductor substrate.

41. The method according to claim 27, wherein said sensing of said at least one spectral signal and said at least one zero-input radiation signal occurs concurrently.

42. A spectrometer comprising:
  an entrance aperture through which a plurality of input optical radiation signals are concurrently received;
  an exit aperture;
  an optical system having a dispersion element, and which directs said plurality of input optical radiation signals along an optical path from said entrance aperture to said exit aperture via said dispersion element which spatially disperses each of said input optical radiation signals according to wavelength; and
  a two-dimensional detector optically coupled to said exit aperture to detect at least a portion of each of said plurality of input optical radiation signals directed by said optical system to said exit aperture.

43. The spectrometer according to claim 42, wherein said optical path is such that any dispersed radiation emergent from said dispersion element as a result of incidence on said dispersion element of said optical radiation being directed by said optical system to said dispersion element from said entrance aperture along said optical path may impinge on said entrance aperture.

44. The spectrometer according to claim 42, wherein said optical system is monocentric and is symmetric about an optical axis, wherein said dispersion element spatially disperses said radiation according to wavelength along a dispersion direction, and wherein said entrance aperture and exit aperture are separated from said optical axis and are intersected by a plane which contains said optical axis and is parallel to said dispersion direction, thereby providing a direct optical path therebetween.

45. The spectrometer according to claim 42, wherein said optical path is a non-direct optical path between said entrance aperture and said exit aperture.

46. The spectrometer according to claim 45, wherein said non-direct optical path is such that any dispersed radiation emergent from said dispersion element as a result of incidence on said dispersion element of said optical radiation being directed by said optical system to said dispersion element from said entrance aperture along said non-direct optical path does not impinge on said entrance aperture.

47. The spectrometer according to claim 45, wherein said optical system is monocentric and is symmetric about an optical axis, wherein said dispersion element spatially disperses said radiation according to wavelength along a dispersion direction, and wherein said entrance aperture and exit aperture are separated from and located on opposite sides of a plane which contains said optical axis and is parallel to said dispersion direction, thereby providing said non-direct optical path therebetween.

48. The spectrometer according to claim 42, further comprising a plurality of optical fibers optically coupled to said entrance aperture, each optical fiber providing a respective one of said plurality of input optical radiation signals.

49. The spectrometer according to claim 48, wherein said entrance aperture is elongated to form an entrance slit and said plurality of optical signals are linearly oriented along said entrance slit.

50. The spectrometer according to claim 49, wherein regions of zero input radiation are between the fibers.

51. The spectrometer according to claim 42, wherein said optical system includes a spherical plano-convex lens, said dispersion element is a spherical concave diffraction grating, and wherein said spherical plano-convex tens and said spherical concave diffraction grating have coincident centers of curvature.

52. The spectrometer according to claim 42, wherein said optical system includes a concave mirror, said dispersion element is a convex diffraction grating, and wherein said concave mirror and convex diffraction grating have coincident centers of curvature.

53. The spectrometer according to claim 42, wherein said two-dimensional detector detects a signal corresponding to a region of zero-input radiation input into said entrance aperture concurrently with said plurality of input optical radiation signals, the spectrometer further compromising a processor that corrects or compensates at least one detected said input optical radiation signals according to said signal corresponding a region of zero-input radiation.

54. A spectrometer comprising:
an entrance aperture through which an input optical radiation signal is received;
a detector;
a concentric optical system symmetric about an optical axis and having a dispersion element, and which directs said optical radiation signal along an optical path from said entrance aperture to said detector via said dispersion element which spatially disperses said optical radiation signal according to wavelength; and
a light trap disposed such that optical radiation is prevented from producing reflected light which interferes with optical signals detected by said detector.

55. The spectrometer according to claim 54, wherein said light trap substantially prevents optical radiation which impinges proximate to an active area of said detector from reflecting back to said diffraction element or said entrance slit.

56. The spectrometer according to claim 54, wherein said light trap substantially prevents generation of stray light or re-entrant spectra.

57. The spectrometer according to claim 54, wherein said optical system includes a spherical plano-convex lens which includes said light trap.

58. The spectrometer according to claim 57, wherein the planar surface of said plano-convex lens includes a bevel to provide said light trap.

59. The spectrometer according to claim 57, wherein said light trap includes a material that substantially absorbs optical radiation incident thereon.

60. The spectrometer according to claim 57, wherein said light trap includes a surface which provides substantially diffuse reflection for any optical radiation reflected therefrom.

61. A spectrometer comprising:
an entrance slit assembly including an entrance slit and a plurality of optical fibers that each guide one of a respective plurality of input optical radiation signals into the spectrometer via the entrance slit;
a spherical plano-convex lens;
a concave diffraction grating having substantially parallel grooves, and having a common optical axis and substantially coincident center of curvature relative to said spherical plano-convex lens;
an exit aperture oriented such that said entrance aperture and said exit aperture are separated from and located on opposite sides of a plane which contains said optical axis and which is perpendicular to a direction along the parallel grooves of said concave diffraction grating, thereby providing a non-direct optical path between the entrance and exit apertures; and
a detector optically coupled to the exit aperture, and which senses a plurality of spectral signals each corresponding to one of the respective plurality of input optical signals directed by said spherical plano-convex lens to said concave diffraction grating, dispersed according to wavelength and directed to said spherical plano-convex lens by said diffraction grating, and directed by said spherical plano-convex lens to said exit aperture.

62. The spectrometer according to claim 61, wherein said detector concurrently senses said plurality of spectral signals.

63. A spectrometer comprising:
an entrance slit assembly including an entrance slit and a plurality of optical fibers that each guide one or a respective plurality of input optical radiation signals into the spectrometer via the entrance slit;
a concave mirror;
a convex diffraction grating having substantially parallel grooves, and having a common optical axis and substantially coincident center of curvature relative to said concave mirror;
an exit aperture oriented such that said entrance aperture and said exit aperture are separated from and located on opposite sides of a plane which contains said optical axis and which is perpendicular to a direction along the parallel grooves of said convex diffraction grating, thereby providing a non-direct optical path between the entrance and exit apertures; and a detector optically coupled to the exit aperture, and which senses a plurality of spectral signals each corresponding to one or the respective plurality of input optical signals directed by said concave mirror to said convex diffraction grating, dispersed according to wavelength and directed to said concave mirror by said convex diffraction grating, and directed by said concave mirror to said exit aperture.

64. The spectrometer according to claim 63, wherein said detector concurrently senses said plurality of spectral signals.

65. A spectrometer comprising:

receiving means for receiving optical radiation into the spectroimeter;

transmitting means for transmitting an optical radiation spectrum according to wavelength of the optical radiation received by the receiving means;

means for directing said optical radiation along a non-direct optical path from said receiving means to said transmitting means and for dispersing said input optical radiation signal according to wavelength to generate the optical radiation spectrum; and means for detecting at least a portion of said optical radiation spectnum transmitted by said transmitting means.

66. The spectrometer according to claim 65, wherein said means for receiving includes an entrance slit.

67. The spectrometer according to claim 65, wherein said means for directing includes a Dyson-type optical configuration.

68. The spectrometer according to claim 65, wherein said means for directing includes an Offner-type optical configuration.

* * * * *

UNITED STATES PATENT AND TRADEMARK OFFICE
CERTIFICATE OF CORRECTION

PATENT NO. : 6,181,418 B1
DATED : January 30, 2001
INVENTOR(S) : Perry A. Palumbo et al.

It is certified that error appears in the above-identified patent and that said Letters Patent is hereby corrected as shown below:

Column 16, claim 23,
Line 63, "signal so," should read -- signals, --.

Column 17, claim 27,
Line 21, "all area" should read -- an area --.

Column 19, claim 51,
Line 43, "tens" should read -- lens --.

Column 19, claim 53,
Line 55, "compromising" should read -- comprising --.

Column 20, claim 63,
Line 57, "or" should read -- of --.

Column 21, claim 63,
Line 8, "or" should read -- of --.

Column 21, claim 65,
Line 19, "spectroimeter," should read -- spectrometer; --.

Column 22, claim 65,
Line 10, "spectnum" should read -- spectrum --.

Signed and Sealed this

Thirteenth Day of November, 2001

*Attest:*

NICHOLAS P. GODICI
*Attesting Officer*     *Acting Director of the United States Patent and Trademark Office*